United States Patent
Li

(10) Patent No.: US 11,152,984 B2
(45) Date of Patent: Oct. 19, 2021

(54) RECEIVER, COMMUNICATION SYSTEM, AND METHOD IMPLEMENTED BY COMPUTER FOR ENABLING BOTH ANALOG AND DIGITAL BEAMFORMING IN COMMUNICATION SYSTEM

(71) Applicant: MITSUBISHI ELECTRIC CORPORATION, Tokyo (JP)

(72) Inventor: Qianrui Li, Rennes (FR)

(73) Assignees: MITSUBISHI ELECTRIC R&D CENTRE EUROPE B.V., Schiphol Rijk (NL); MITSUBISHI ELECTRIC CORPORATION, Tokyo (JP)

( * ) Notice: Subject to any disclaimer, the term of this patent is extended or adjusted under 35 U.S.C. 154(b) by 66 days.

(21) Appl. No.: 16/603,779

(22) PCT Filed: May 10, 2018

(86) PCT No.: PCT/JP2018/019000
§ 371 (c)(1),
(2) Date: Oct. 8, 2019

(87) PCT Pub. No.: WO2018/212258
PCT Pub. Date: Nov. 22, 2018

(65) Prior Publication Data
US 2020/0136691 A1 Apr. 30, 2020

(30) Foreign Application Priority Data
May 17, 2017 (EP) .................................... 17305566

(51) Int. Cl.
| | |
|---|---|
| *H04B 7/0456* | (2017.01) |
| *H04B 7/0417* | (2017.01) |
| *H04B 7/06* | (2006.01) |
| *H04L 25/02* | (2006.01) |
| *H04L 27/26* | (2006.01) |

(52) U.S. Cl.
CPC ......... *H04B 7/0478* (2013.01); *H04B 7/0417* (2013.01); *H04B 7/0617* (2013.01);
(Continued)

(58) Field of Classification Search
CPC .... H04B 7/0617; H04B 7/063; H04L 25/0248
See application file for complete search history.

(56) References Cited

U.S. PATENT DOCUMENTS

| | | | |
|---|---|---|---|
| 9,967,014 B1* | 5/2018 | Park ..................... | H04B 7/0456 |
| 2009/0285325 A1* | 11/2009 | Zhou ................... | H04L 27/2608 |
| | | | 375/267 |

(Continued)

FOREIGN PATENT DOCUMENTS

JP 2008-519510 A 6/2008

OTHER PUBLICATIONS

Office Action issued in counterpart Japanese Application No. 2019-546053 dated Nov. 10, 2020 with an English Translation.

(Continued)

*Primary Examiner* — Zhiren Qin
(74) *Attorney, Agent, or Firm* — Birch, Stewart, Kolasch & Birch, LLP

(57) ABSTRACT

A method for enabling hybrid beamforming in a communication system including a transmitter being able to serve a plurality of receivers, wherein a frequency band comprises at least one subcarrier, wherein each receiver is associated to a set Cprec,k of analog precoding codewords, said method comprising: —for each receiver, computing (202) an analog precoding matrix FRF k associated to said receiver; said computation (202) comprising: /a/ for each subcarrier, performing (202a) a Singular Value Decomposition, SVD, on a channel matrix associated to said receiver and to said each subcarrier; /b/ for each subcarrier, determining a first decomposition matrix Vk(1) based on the relative SVD; /c/ deter- (Continued)

mining (303) an analog precoding codeword which optimizes a first function $g1(Vk(1), \ldots, Vk(L), F)$ of $Vk(1), \ldots, Vk(L)$ and F, for a plurality of $F \in C_{prec,k}$, wherein L denotes a number of subcarriers.

14 Claims, 6 Drawing Sheets

(52) U.S. Cl.
CPC ....... *H04B 7/0634* (2013.01); *H04L 25/0248* (2013.01); *H04L 27/2644* (2013.01)

(56) References Cited

U.S. PATENT DOCUMENTS

| | | | |
|---|---|---|---|
| 2010/0232352 A1 | 9/2010 | Merlin et al. | |
| 2013/0279781 A1* | 10/2013 | Ding | G01R 33/4818 382/131 |
| 2014/0093005 A1 | 4/2014 | Xia et al. | |
| 2018/0175895 A1* | 6/2018 | Silverman | H04B 1/525 |

OTHER PUBLICATIONS

Christensen et al., "Weighted Sum-Rate Maximization using Weighted MMSE for MIMO-BC Beamforming Design", IEEE Transactions on Wireless Communications, vol. 7, No. 12, Dec. 1, 2008, pp. 4792-4799.

International Search Report for PCT/JP2018/019000 dated Aug. 7, 2018.

Scaglione et al., "Optimal Designs for Space-Time Linear Precoders and Decoders", IEEE Transactions on Signal Processing., vol. 50, No. 5, May 1, 2002, pp. 1051-1064.

Written Opinion of the International Searching Authority for PCT/JP2018/019000 dated Aug. 7, 2018.

* cited by examiner

RECEIVER, COMMUNICATION SYSTEM, AND METHOD IMPLEMENTED BY COMPUTER FOR ENABLING BOTH ANALOG AND DIGITAL BEAMFORMING IN COMMUNICATION SYSTEM

TECHNICAL FIELD

The present invention relates to hybrid beamforming in a multi-user multi-antenna system, for instance a Multiple-Input/Multiple-Output (MIMO) system, and more specifically to the analog and digital precoders and combiners in such a system.

BACKGROUND ART

Millimeter wave (mmWave) wireless communication, which makes use of carrier frequencies going from 30 gigahertz (GHz) to 300 GHz, is expected to be a key feature, for instance, for future 5G cellular systems. A major benefit of using such high frequencies is the availability of much greater spectrum for higher data rates.

Millimeter wave propagation is especially characterized by high path loss in free space, high penetration loss through building materials, weak diffraction, and vulnerability to blockage. Therefore, highly directional adaptive antenna arrays at both transmission and reception sides have to be used for compensating propagation impairments and enabling cellular coverage over distances of few hundred meters.

Directional arrays are usually constructed using a very large number of antenna elements, for instance tens to several hundreds.

In addition to high directional gain, the use of large antenna arrays enhances spatial multiplexing since narrower beams can be realized.

Directional gain and spatial multiplexing can be achieved by a careful design of beamforming precoders and combiners at transmission and reception sides, respectively.

This design of transmitter/receiver precoders and combiners in systems with large antenna arrays is a quite difficult task.

Firstly, it depends on the choice of the system architecture.

In the case of systems with large antenna arrays, since the high bandwidth mixed-signal components are expensive and consume lots of power, the number of Radio Frequency (RF) chains at the transceiver needs to be smaller than the number of antennas.

In order to reduce the number of RF chains, pure analog domain processing and hybrid analog/digital architectures may be considered. One of the advantages of hybrid architectures is that the additional digital processing can be used to compensate the lack of precision (due, for instance, to phase shifters that only work with a finite phase resolution) of analog processing.

Besides the choice of analog or hybrid architecture, knowing that those architectures are generally implemented with devices such as phase shifters, switches or optical lenses, particular architecture embodiment and the constraints on the implementation devices also lead to additional constraints on the transmitter and receiver beamforming design in systems with large antenna arrays.

Secondly, most of the algorithms used to design transmitter/receiver precoders and combiners in conventional systems (for instance, systems using frequency bands below 6 GHz) are not suitable for systems composed of large antenna arrays.

Indeed, the conventional algorithms generally rely on the amount of channel state information (CSI) available to the system.

The channel state information at the receiver (CSIR) can be obtained by a downlink (DL) channel estimation operation, and the channel state information at the transmitter (CSIT) is generally acquired by CSI feedback from receiver to the transmitter.

When large antenna arrays are used at both the receiver and transmitter sides, each user channel is represented by a matrix with very large dimensions, and the signaling overhead for the CSI feedback becomes unaffordable.

Some algorithms for hybrid beamforming design have been developed.

Taking into account the architecture and device constraints, some of them consider a joint design of analog and digital precoders/combiners that best approximates the conventional full digital beamforming. However, these algorithms do not consider the above-mentioned issue of heavy signaling overhead.

Another approach consists in considering a two-stage algorithm that separates the analog beamformer/combiner design (calculated in a first stage) from the digital beamformer/combiner design (calculated in a second stage).

Such two-stage algorithms have been developed for massive MIMO systems. They usually propose to use an array gain harvesting criterion for the first stage of analog precoder/combiner (also referred to as "RF precoder/combiner" or "RF domain precoder/combiner") design and a zero forcing or a block diagonalization criterion for the second stage of digital precoder/combiner (also referred to as "base band precoder/combiner" or "base band domain precoder/combiner") design.

In the first stage design, the RF precoder and combiner are selected by each receiver based on local CSIR.

Then, the equivalent user channel, which is the user channel after RF beamforming and combining, is fed back to the transmitter.

Since the number of transmit and receive RF chains is much smaller than the number of transmit and receive antennas, the dimensions for the equivalent user channel is much smaller than the dimension of the original user channel. As a result, the feedback overhead is largely reduced.

In the second stage design, the digital precoder and combiner can be calculated from CSIT of the equivalent user channel.

Even though such two-stage algorithms reduce the signaling overhead issue, they have drawbacks.

For instance, some of them only work for single stream transmission, while others have poor performances in terms of system sum rate maximization.

There is thus a need for a method for enabling efficient hybrid (analog and digital) beamforming, suitable for multi-user multi-data streams massive MIMO systems, which overcomes the issues of signaling overhead and low performances in terms of system sum rate maximization.

SUMMARY OF INVENTION

The invention relates to a method implemented by a computer for enabling both analog and digital beamforming in a communication system including a transmitter being able to serve a plurality of receivers, wherein a frequency band comprises at least one subcarrier wherein each receiver among the plurality of receivers is associated to a relative set $\mathcal{C}_{prec,k}$ of analog precoding codewords, said method comprising:

for each receiver among the plurality of receivers, computing, at said receiver, an analog precoding matrix $F_{RF,k}$ associated to said receiver; and using at least one computed analog precoding matrix for processing at least one signal to transmit from the transmitter to at least one receiver;

characterized in that the computation of the analog precoding matrix associated to a receiver among the plurality of receivers comprises:

/a/ for each subcarrier, performing a Singular Value Decomposition, SVD, on a channel matrix associated to said receiver and to said each subcarrier;

/b/ for each subcarrier, determining a first decomposition matrix $\overline{V}_k(l)$ based on the relative SVD;

/c/ determining an analog precoding codeword which optimizes a first function $g_1(\overline{V}_k(1), \ldots, \overline{V}_k(L), F)$ of $\overline{V}_k(1), \ldots, \overline{V}_k(L)$ and F, for a plurality of $F \in \mathcal{C}_{prec,k}$, wherein L denotes a number of subcarriers.

By a system supporting "both analog and digital beamforming" it is meant that the system supports digital and/or analog precoding (in which case the transmitter comprises components for performing digital and/or analog precoding) and/or digital and/or analog combining (in which case the transmitter comprises components for performing digital and/or analog combining). For instance, such a system may support hybrid (both digital and analog) precoding and hybrid combining, or hybrid precoding and analog-only combining, etc.

The method may be performed in a system enabling a process of data on multiple carrier frequency (for instance, a wide band communication system, which may support an OFDM method), or on only one carrier frequency (for instance, a narrow band communication system).

The wording "receiver" may include a device that receives a signal from the transmitter, as well as a user equipment, a mobile station, etc.

It is meant by "analog/digital precoding/combining matrix" a matrix specifically associated to one receiver. The whole set of analog/digital precoding/combining matrices is referred to as an analog/digital precoder/combiner. For instance, $F_{BB} = [F_{BB,1} \ldots F_{BB,k} \ldots F_{BB,K}]$, is a digital precoder, and each $F_{BB,k}$ is a digital precoding matrix associated to a receiver k.

Of course, any letter or group of letters ($F_{BB}$, $g_1(\overline{V}_k(1), \ldots, \overline{V}_k(L), F), \ldots$) which is used for identifying a function, a matrix, or any mathematical entity, is simply intended to simplify reading and understanding of the present invention, and does not represent any limitation of the principles and technical features of the invention to these letters or denominations.

Furthermore, as mentioned before, any of wordings "analog", "RF" or "RF domain" may be used without distinction. Similarly, any of wordings "digital", "base band" or "base band domain" may be used without distinction.

By "codebook", it is meant a set of predetermined matrices or vectors from which the precoding/combining matrices, or columns of precoding/combining matrices, are chosen. Elements of a codebook are referred to as "codewords". For instance, an element of a codebook corresponding to a RF precoding matrix is referred to as an analog precoding codeword (or RF precoding codeword), and an element of a codebook corresponding to a RF combining matrix is referred to as an analog combining codeword (or RF combining codeword).

As detailed later, a "channel matrix associated to a receiver" refers to a Channel State Information at the Receiver (CSIR) matrix. This CSIR may be know perfectly, or estimated, for instance by a downlink (DL) estimation procedure based on pilots.

By "optimize", it is meant either maximize or minimize, depending on the criterion and the first function that is used.

After obtaining CSIR, a Channel State Information at the Transmitter (CSIT) is usually acquired by Channel State Information (CSI) feedback. In case of a large number of transmitting and receiving antennas (also referred to as "transmit and receive antennas"), each user channel is a matrix with very large dimensions and the signaling overhead for the CSI feedback becomes unaffordable.

In the present invention, since the computations in RF domain and in base band domain are separated, the signaling overhead for the CSI feedback is reduced.

Indeed, after the computation of the RF precoder and combiner, the equivalent user channel, which is the user channel after RF beamforming and combining, is fed back to the transmitter. Since the number of transmit and receive RF chains is much smaller than the number of transmit and receive antennas, the dimensions for the equivalent user channel is much smaller than the dimension of the original user channel. As a result, the feedback overhead is largely reduced.

Furthermore, as detailed after, the computation of the analog precoding matrices as performed in steps /a/, /b/ and /c/ enables to maximize the sum rate of the system.

More precisely, the invention addresses the problem of solving the following sum rate optimization problem:

$$\max_{W_{RF,k}, F_{RF,k}} \sum_{l=1}^{L} \sum_{k=1}^{K} \log\left(\det\left(\frac{P}{KL_r} W_{RF,k}^H H_k(l) F_{RF,k} F_{RF,k}^H H_k^H(l) W_{RF,k} + I\right)\right)$$

$$\text{s.t.} \quad W_{RF,k} \in \mathcal{C}_{comb,k}$$
$$F_{RF,k} \in \mathcal{C}_{prec,k}$$

In the general case of a system in which $L \geq 1$ (one subcarrier, or a plurality of subcarriers), the first function may be given by:

$$g_1(\overline{V}_k(1), \ldots, \overline{V}_k(L), F) = \sum_{l=1}^{L} \left(L_{r_k} - tr\left(FF^H \overline{V}_k(l) \overline{V}_k^H(l)\right)\right)$$

where:

tr(A) denotes a trace of a matrix A;

$A^H$ denotes a conjugate transpose matrix of a matrix A;

$L_{r_k}$ is a number of receiving analog chains at said receiver;

$\overline{V}_k(l)$ is the first decomposition matrix associated to the receiver k for a subcarrier l;

and the optimization of the first function may be a minimization.

In the following, when L=1, $\overline{V}_k(1)$ is referred to as $\overline{V}_k$, in order to simplify the notations.

When the number of subcarriers is equal to 1 (L=1), the above optimization problem, that is the minimization of the function $\sum_{l=1}^{L}(L_{r_k} - tr(FF^H \overline{V}_k(l) \overline{V}_k^H(l)))$, is equivalent to a minimization of the function $\|\overline{V}_k \overline{V}_k^H - FF^H\|_F^2$, where $\|A\|_F$ denotes a norm of a matrix A (for instance the Frobenius norm) and $A^H$ denotes a conjugate transpose matrix of a matrix A.

That means that the above optimization problem may be solved, in the specific case where L=1, by choosing:

$$F_{RF,k} = \underset{F \in \mathcal{C}_{prec,k}}{\operatorname{argmin}} \|\overline{V}_k \overline{V}_k^H - FF^H\|_F^2$$

More generally, in the case of a single carrier system (L=1), the optimization problem may be written:

$$\max_{W_{RF,k}, F_{RF,k}} \log\left(\det\left(\frac{P}{KL_r} W_{RF,k}^H H_k F_{RF,k} F_{RF,k}^H H_k^H W_{RF,k} + I\right)\right)$$

s.t.

$$W_{RF,k} \in \mathcal{C}_{comb,k}$$

$$F_{RF,k} \in \mathcal{C}_{prec,k}$$

For solving this optimization problem, it is proposed to choose, at each receiver k, an RF precoding matrix $F_{RF,k}$ in the RF precoding codebook $\mathcal{C}_{prec,k}$ and/or an RF combining matrix $W_{RF,k}$ in the RF combining codebook $\mathcal{C}_{comb,k}$ such that a quantity $$\Delta R_k = R_k(\overline{U}_k, \overline{V}_k) - R_k(W_{RF,k}, F_{RF,k})$$

is minimal (and eventually tends to zero when the size of the codebooks increases), $R_k(W_{RF,k}, F_{RF,k})$ being a function of $W_{RF,k}$ and $F_{RF,k}$.

A plurality of criteria, which are alternative solutions for solving the same technical problem, may be used for the minimization of $\Delta R_k$.

As mentioned before, for a number of subcarriers equal to 1, the first function $g_1(\overline{V}_k, F)$ may be given by:

$$g_1(\overline{V}_k, F) = \|\overline{V}_k \overline{V}_k^H - FF^H\|_F^2$$

In this case, the optimization of the first function is a minimization.

Alternatively, for a number of subcarriers equal to 1, and when each analog precoding codeword F is chosen among a set of columns of a predetermined matrix having a number of rows equal to a number of antennas of the transmitter and a number of columns grower or equal than $L_{r_k}$, said matrix being relative to Discrete Fourier Transform, DFT, matrix, the first function $g_1(\overline{V}_k, F)$ may be given by:

$$g_1(\overline{V}_k, F) = \sum_{i=1}^{L_{r_k}} \sum_{j=1}^{L_{r_k}} |(F(:,i))^H \cdot \overline{V}_k(:,j)|^2$$

where:
$L_{r_k}$ is a number of receiving analog chains at said receiver;
$|Q|$ denotes a magnitude of a complex Q;
$A^H$ denotes a conjugate transpose matrix of a matrix A; and
$A(:,j)$ is a j-th column of a matrix A.
and the optimization of the first function may be a maximization.

In this case, the maximization may include:
for each column $c_i$ of said predetermined matrix, calculating:

$$t_i = \sum_{j=1}^{L_{r_k}} |c_i^H \cdot \overline{V}_k(:,j)|^2$$

and
selecting columns $c_i$ corresponding to $L_{r_k}$ largest values of $t_i$ among all values of $t_i$.

In another embodiment, the first function $g_1(\overline{V}_k, F)$ may be given by:

$$g_1(\overline{V}_k, F) = \lambda_{min}(\overline{V}_k^H FF^H \overline{V}_k)$$

where:
$A^H$ denotes a conjugate transpose matrix of a matrix A; and
$\lambda_{min}(A)$ denotes a minimal eigenvalue of a matrix A.
and wherein the optimization of the first function is a maximization.

By a "matrix being relative to DFT matrix", it is meant that the matrix may be a DFT matrix, or an oversampled DFT matrix, which is a matrix constructed by re-normalizing a sub-matrix selected from a DFT matrix.

For instance, an $N_t \times N_{Q_t}$ (with $N_{Q_t} \geq N_t$) oversampled DFT matrix may be constructed by re-normalizing (which means performing operations such that each column has unit norm) a sub-matrix of the first $N_t$ rows of a $N_{Q_t}$ point DFT matrix.

The $N_{Q_t}$ point DFT matrix may be an $N_{Q_t} \times N_{Q_t}$ matrix of the form:

$$W = \frac{1}{\sqrt{N_{Q_t}}} \begin{pmatrix} 1 & 1 & 1 & 1 & \cdots & 1 \\ 1 & \omega & \omega^2 & \omega^3 & \cdots & \omega^{N_{Q_t}-1} \\ 1 & \omega^2 & \omega^4 & \omega^6 & \cdots & \omega^{2(N_{Q_t}-1)} \\ 1 & \omega^3 & \omega^6 & \omega^9 & \cdots & \omega^{3(N_{Q_t}-1)} \\ \vdots & \vdots & \vdots & \vdots & \ddots & \vdots \\ 1 & \omega^{N_{Q_t}-1} & \omega^{2(N_{Q_t}-1)} & \omega^{3(N_{Q_t}-1)} & \cdots & \omega^{(N_{Q_t}-1)\times(N_{Q_t}-1)} \end{pmatrix}$$

where $$\omega = e^{-2\pi i / N_{Q_t}}.$$

The $N_{Q_t}$ point DFT matrix W is unitary, and its columns are orthogonal.

For an oversampled DFT matrix, it is possible to show that, for two columns $c_n$ and $c_m$ (with $c_n \neq c_m$):

$$c_m^H c_n = \frac{1}{N} \sum_{\ell=1}^{N_t} e^{-j2\pi(\ell-1)\left(\frac{n-1}{N_{Q_t}} - \frac{m-1}{N_{Q_t}}\right)}$$

$$= \frac{1}{N_t} \frac{1 - e^{-j2\pi N_t \frac{n-m}{N_{Q_t}}}}{1 - e^{-j2\pi \frac{n-m}{N_{Q_t}}}} \xrightarrow{N_t \to \infty} 0.$$

which means that the columns of the oversampled DFT matrix are asymptotically orthogonal.

Still in the case where the number of subcarriers is equal to 1, and when each analog precoding codeword F is a column of a predetermined matrix having a number of rows equal to a number of antennas of the transmitter and a number of columns grower or equal than $L_{r_k}$, said matrix being relative to Discrete Fourier Transform, DFT, matrix, the first function $g_1(\overline{V}_k, F)$ of step /c/ may be function of:

$$\frac{F^H\overline{V}_k\overline{V}_k^H F + \lambda_{min}(C_{i-1}^H\overline{V}_k\overline{V}_k^H C_{i-1})}{2} - \sqrt{\frac{(F^H\overline{V}_k\overline{V}_k^H F - \lambda_{min}(C_{i-1}^H\overline{V}_k\overline{V}_k^H C_{i-1}))^2}{4} + F^H\overline{V}_k\overline{V}_k^H C_{i-1}C_{i-1}^H\overline{V}_k\overline{V}_k^H F}$$

where:
- $C_{i-1}$ is composed from at least one column of said predetermined matrix;
- F is different from all the columns of $C_{i-1}$;
- $A^H$ denotes a conjugate transpose matrix of a matrix A; and
- $\lambda_{min}(A)$ denotes a minimal eigenvalue of a matrix A.

and the optimization of the first function is a maximization.

In this embodiment, step /c/ is performed iteratively.

This is actually a specific implementation for the above optimization problem, namely the maximization of the function $\lambda_{min}(\overline{V}_k^H FF^H \overline{V}_k)$. Indeed, in order to maximize the function $\lambda_{min}(\overline{V}_k^H \overline{V}_k)$, all the columns of the matrix F should be selected all together since the minimal eigenvalue depends on all the columns of F together.

That means that an optimal solution for finding F which maximizes $\lambda_{min}(\overline{V}_k^H FF^H \overline{V}_k)$, when the columns of matrix F belong to a DFT (or oversampled DFT) matrix with Q columns, may consist in testing all the $Q_k!/(L_{r_k}!(Q-L_{r_k})!)$ possible candidate of F and find the one with the smallest eigenvalue.

Since the computational complexity may become high, the matrix F may be selected column by column as proposed in this specific implementation.

It is also possible to compute analog combining matrices according to a similar concept. More specifically, it may be assumed in the general method (and in any of the previous embodiments of the general method):
- that each receiver among the plurality of receivers is associated to a relative set $\mathcal{C}_{comb,k}$ of analog combining codewords,
- that, for each receiver among the plurality of receivers and for each subcarrier among the plurality of subcarriers, a second decomposition matrix $\overline{U}_k(l)$ is determined, based on the relative SVD performed in step /a/;
- and that the method further comprises, for each receiver among the plurality of receivers:
  - computing, at said receiver, an analog combining matrix $W_{RF,k}$ associated to said receiver, said computation including:
    - determining an analog combining codeword which optimizes a second function $g_2(\overline{U}_k(1), \ldots, \overline{U}_k(L), W)$ of $\overline{U}_k(1), \ldots, \overline{U}_k(L)$ and W, for a plurality of $W \in \mathcal{C}_{comb,k}$.

In the case of a multi carrier system ($L \neq 1$), the second function may be given by:

$$g_2(\overline{U}_k(1), \ldots, \overline{U}_k(L), W) = \sum_{l=1}^{L}(L_{r_k} - tr(WW^H\overline{U}_k(l)\overline{U}_k^H(l)))$$

where:
- tr(A) denotes a trace of a matrix A;
- $A^H$ denotes a conjugate transpose matrix of a matrix A;
- $L_{r_k}$ is a number of receiving analog chains at said receiver;
- $\overline{U}_k(l)$ is the second decomposition matrix associated to the receiver k for a subcarrier l;

and the optimization of the second function is a minimization.

In the following, when L=1, $\overline{U}_k(1)$ is referred to as $\overline{U}_k$, in order to simplify the notations.

When the number of subcarriers is equal to 1 (L=1), the above optimization problem, that is the minimization of the function $\Sigma_{l=1}^L(L_{r_k} - tr(WW^H\overline{U}_k(1)\overline{U}_k^H(1)))$, is equivalent to a minimization of the function $\|\overline{U}_k\overline{U}_k^H - WW^H\|_F^2$.

That means that the above optimization problem may be solved, in the specific case where L=1, by choosing:

$$W_{RF,k} = \underset{W \in \mathcal{C}_{comb,k}}{\operatorname{argmin}} \|\overline{U}_k\overline{U}_k^H - WW^H\|_F^2$$

More generally, as for the computation of analog precoding matrices, when L=1, it is possible to choose the analog combining matrices among a plurality of analog combining codewords in order to minimize $\Delta R_k$.

As mentioned before, when the number of subcarriers is equal to 1, the second function $g_2(\overline{U}_k, W)$ may be given by:

$$g_2(\overline{U}_k, W) = \|\overline{U}_k\overline{U}_k^H - WW^H\|_F^2$$

In this case, the optimization of the second function is a minimization.

Alternatively, when the number of subcarriers is still equal to 1, and when each analog precoding codeword F is chosen among a set of columns of a predetermined matrix having a number of rows equal to a number of antennas of the transmitter and a number of columns grower or equal than $L_{r_k}$, said matrix being relative to Discrete Fourier Transform, DFT, matrix, the second function $g_2(\overline{U}_k, W)$ may be given by:

$$g_2(\overline{U}_k, W) = \sum_{i=1}^{L_r}\sum_{j=1}^{L_r}|(W(:,i))^H \cdot \overline{U}_k(:,j)|^2$$

where:
- $L_{r_k}$ is a number of receiving analog chains at said receiver;
- |Q| denotes a magnitude of a complex Q;
- $A^H$ denotes a conjugate transpose matrix of a matrix A; and
- A(:, j) is a j-th column of a matrix A.

and wherein the optimization of the second function is a maximization.

In the previous embodiment, the maximization of the second function may include:
for each column $c_i$ of said predetermined matrix, calculating:

$$b_i = \sum_{j=1}^{L_{r_k}}|c_i^H \cdot \overline{U}_k(:,j)|^2$$

and
selecting columns $c_i$ corresponding to $L_{r_k}$ largest values of $b_i$ among all values of $b_i$.

Alternatively, still when the number of subcarriers is equal to 1, the second function $g_2(\overline{U}_k, W)$ may be given by:

$$g_2(\overline{U}_k, W) = \lambda_{min}(\overline{U}_k^H WW^H \overline{U}_k)$$

where:
A$^H$ denotes a conjugate transpose matrix of a matrix A; and
$\lambda_{min}$(A) denotes a minimal eigenvalue of a matrix A.
and wherein the optimization of the second function is a maximization.

When each analog combining codeword W is a column of a predetermined matrix having a number of rows equal to a number of antennas of the transmitter and a number of columns grower or equal than $L_{r_k}$, said matrix being relative to Discrete Fourier Transform, DFT, matrix, then, in step /c/ the second function $g_2(\overline{U}_k, W)$ may be function of:

$$\frac{W^H \overline{U}_k \overline{U}_k^H W + \lambda_{min}(Z_{i-1}^H U_k \overline{U}_k^H Z_{i-1})}{2} -$$
$$\sqrt{\frac{(W^H \overline{U}_k \overline{U}_k^H W - \lambda_{min}(Z_{i-1}^H U_k \overline{U}_k^H Z_{i-1}))^2}{4} + W^H \overline{U}_k \overline{U}_k^H Z_{i-1} Z_{i-1}^H \overline{U}_k \overline{U}_k^H W}$$

where:
$Z_{i-1}$ is composed from at least one column of said predetermined matrix;
W is different from all the columns of $T_{i-1}$;
A$^H$ denotes a conjugate transpose matrix of a matrix A; and
$\lambda_{min}$(A) denotes a minimal eigenvalue of a matrix A.

In this case, the optimization of the second function is a maximization and step /c/ may be performed iteratively.

As for the computation of analog precoding matrices, this is actually a specific implementation for the above optimization problem, namely the maximization of the function $\lambda_{min}(\overline{U}_k^H W W^H \overline{U}_k)$. According to this specific implementation, the matrix W is selected column by column.

In a possible embodiment, the method may further comprise:
for each receiver among the plurality of receivers, receiving, at the transmitter, an estimation of an equivalent user channel between the transmitter and said each receiver;
recursively computing, at the transmitter:
a first set of digital combining matrices, each digital combining matrix of said first set being associated to a receiver among the plurality of receivers, based on the received estimation of the equivalent user channel and on the computed analog combining matrices; and
a second set of digital precoding matrices, each digital precoding matrix of said second set being associated to a receiver among the plurality of receivers, based on the received estimation of the equivalent user channel and at least one digital combining matrix among the first set.

The recursive computation may include:
/d/ For each receiver k among the plurality of K receivers, Calculate:

$$Q_k = \sum_{l \neq k}^{K} H_k^{eq} F_{BB,l} F_{BB,l}^H (H_k^{eq})^H + \sigma^2 W_{RF,k}^H W_{RF,k}$$

where:
$H_k^{eq}$ is the estimation of the equivalent user channel between the transmitter and said receiver k;
$H^{eq} = [(H_1^{eq})^T \ldots (H_K^{eq})^T]^T$;

$F_{BB,l}$ is a current digital combining matrix associated to a receiver l;
$\sigma^2$ is a variance of a signal noise;
$W_{RF,k}$ is the computed analog combining matrix associated to the receiver k;
tr(A) is the trace of a matrix A;
A$^H$ denotes a conjugate transpose matrix of a matrix A.

Update the relative digital combining matrix $W_{BB,k}$ according to:

$$W_{BB,k}^H = F_{BB,k}^H (H_k^{eq})^H (H_k^{eq} F_{BB,k} F_{BB,k}^H (H_k^{eq})^H + Q_k)^{-1}$$

where
A$^{-1}$ denotes an inverse of a matrix A;
And calculate:

$$M_k = I + F_{BB,k}^H (H_k^{eq})^H Q_k^{-1} H_k^{eq} F_{BB,k}$$

where
I is a matrix identity;
/e/ Define:

$$\overline{F} = \left( (H^{eq})^H W M W^H H^{eq} + \frac{tr(\sigma^2 M W^H R W)}{P} I \right)^{-1} (H^{eq})^H W M$$

where:
$W^H$ is a block diagonal matrix whose blocks are equal to $W_{BB,1}^H, \ldots, W_{BB,K}^H$;
M is a block diagonal matrix whose blocks are equal to $M_1, \ldots, M_K$;
R is a block diagonal matrix whose blocks are equal to $W_{RF,1}^H W_{RF,1}, \ldots, W_{RF,K}^H W_{RF,K}$;
P is an average total transmitting power.
Calculate the second set of digital precoding matrices from $\overline{F}$.

It is mean by "current" value a value at a current iteration.

Once the analog precoding and combining matrices are determined, a CSIT is fed back to the transmitter and the digital precoding and combining matrices may be determined based on this CSIT.

Another aspect of the invention relates to a receiver configured to receive data from a transmitter able to serve a plurality of receivers, in a communication system enabling both analog and digital beamforming, and wherein a frequency band comprises at least one subcarrier,
said receiver being associated to a set $\mathcal{C}_{prec,k}$ of analog precoding codewords,
said receiver comprising a circuit for computing an analog precoding matrix $F_{RF,k}$,
characterized in that the computation of the analog precoding matrix comprises:
/a/ for each subcarrier, performing a Singular Value Decomposition, SVD, on a channel matrix associated to said each subcarrier;
/b/ for each subcarrier, determining a first decomposition matrix $\overline{V}_k(l)$ based on said SVD; and
/c/ determining an analog precoding codeword which optimizes a first function $g_1(\overline{V}_k(1), \ldots, \overline{V}_k(L), F)$ of $\overline{V}_k(1), \ldots, \overline{V}_k(L)$ and F, for a plurality of F∈$\mathcal{C}_{prec,k}$,
wherein L denotes a number of subcarriers.

In complement, this receiver being further may be associated to a relative set $\mathcal{C}_{comb,k}$ of analog combining codewords, and for each subcarrier among the plurality of subcarriers, a second decomposition matrix $\overline{U}_k(l)$ may be determined, based on said SVD;

said receiver further comprising a circuit for computing an analog combining matrix $W_{RF,k}$, said computation including:

determining an analog combining codeword which optimizes a second function $g_2(\overline{U}_k(1), \ldots, \overline{U}_k(L), W)$ of $\overline{U}_k(1), \ldots, \overline{U}_k(L)$ and W, for a plurality of $W \in \mathcal{C}_{comb,k}$.

Yet another aspect of the invention relates to a communication system enabling both analog and digital beamforming, comprising a transmitter being able to serve a plurality of receivers, wherein each receiver is defined as mentioned before.

A last aspect relates to a computer program product comprising a computer readable medium, having thereon a computer program comprising program instructions. The computer program is loadable into a data-processing unit and adapted to cause the data-processing unit to carry out all or part of the method described above when the computer program is run by the data-processing unit.

Other features and advantages of the method and apparatus disclosed herein will become apparent from the following description of non-limiting embodiments, with reference to the appended drawings.

The present invention is illustrated by way of example, and not by way of limitation, in the figures of the accompanying drawings, in which like reference numerals refer to similar elements.

DESCRIPTION OF EMBODIMENTS

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

Figure 1:
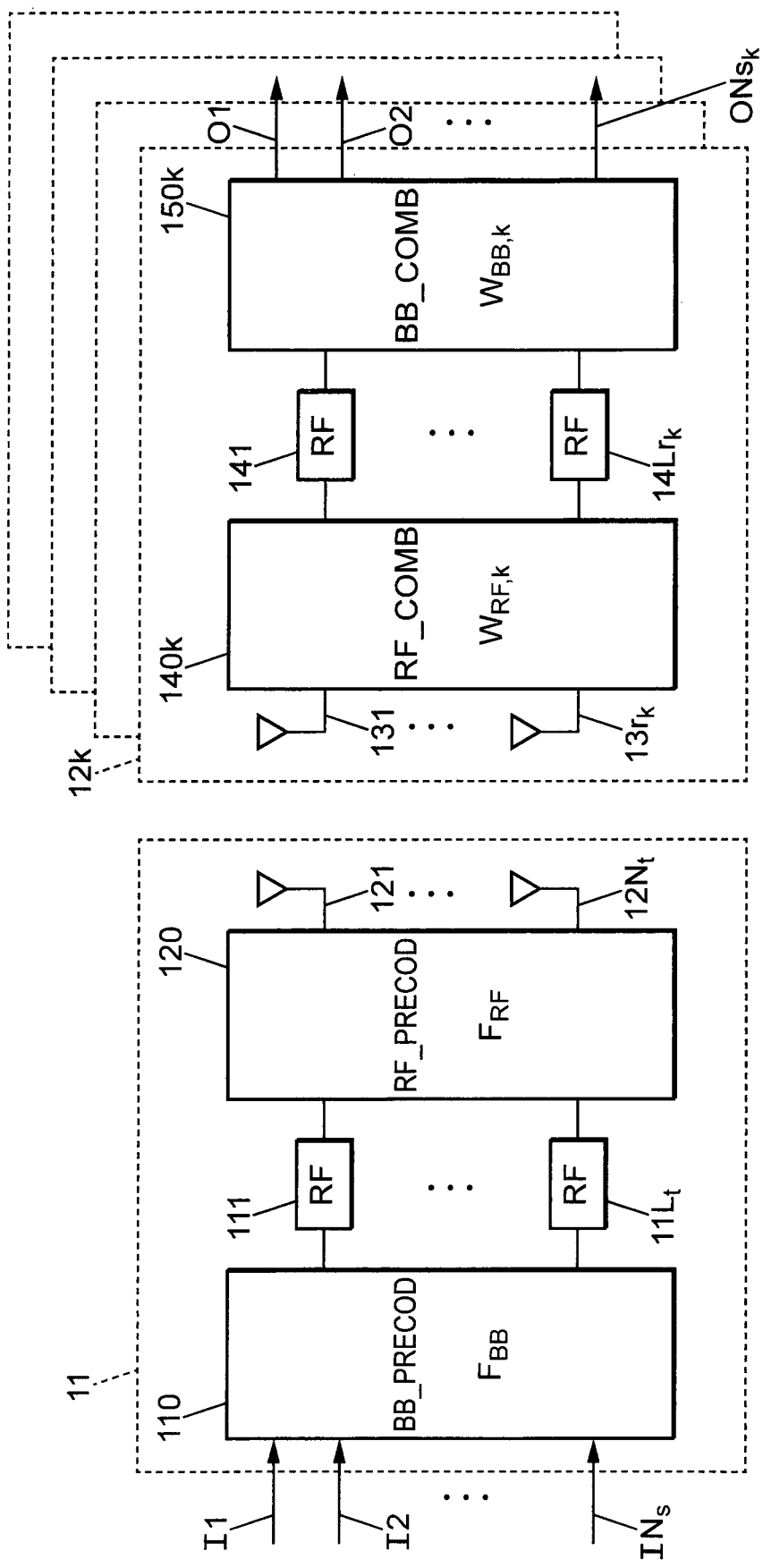
FIG. 1 represents an example of system supporting both analog and digital beamforming in which the present method can be performed.

FIG. 1 represents an example of system supporting both analog and digital beamforming in which the present method can be performed.

According to FIG. 1, the system includes a transmitter 11 equipped with $N_t$ transmit antennas (or "transmitting antennas", or "transmitter antennas") 121, . . . , $12N_t$, wherein the transmitter 11 is able to jointly serve K (with K≥2) receivers 12k.

Each receiver 12k is equipped with $N_{r_k}$ receive antennas (or "receiving antennas", or "receiver antennas") 131, . . . , $13r_k$ and is able to receive $N_{s_k}$ data streams from the transmitter 11.

The total number of streams I1, I2, . . . , $IN_s$ transmitted by the transmitter 11 is thus:

$$N_s = \sum_{k=1}^{K} N_{s_k}$$

It is assumed that the transmitter 11 has $L_t$ transmitting Radio Frequency (RF) chains 111, . . . , $11L_t$ and that each receiver 12k has $L_{r_k}$ receiving RF chains 141, . . . , $14L_{r_k}$.

The following constraints are also assumed:
$N_t \geq L_t \geq N_s$ and $N_{r_k} \geq L_{r_k} \geq N_{s_k}$ and $$L_t = \sum_{k=1}^{K} L_{r_k}.$$

At the transmitter 11, data streams I1, I2, . . . , $IN_s$ are processed by a base band precoder 110, $F_{BB}$, which is a complex matrix (that is, a matrix with complex components) of dimensions $L_t \times N_s$, followed by an RF precoder 120, $F_{RF}$, which is a complex matrix of dimensions $N_t \times L_t$.

The base band precoder 110 can be written $F_{BB} = [F_{BB,1} \ldots F_{BB,k} \ldots F_{BB,K}]$, wherein, for $1 \leq k \leq K$, $F_{BB,k}$ is a complex matrix of dimensions $L_t \times N_{s_k}$. $F_{BB,k}$ is referred to as the base band precoding matrix (or "digital precoding matrix") associated to the k-th receiver 12k.

The RF precoder 120 can be written $F_{RF} = [F_{RF,1} \ldots F_{RF,k} \ldots F_{RF,K}]$, wherein, for $1 \leq k \leq K$, $F_{RF,k}$ is a complex matrix of dimensions $N_t \times L_{r_k}$. $F_{BB,k}$ is referred to as the RF precoding matrix (or "analog precoding matrix") associated to the k-th receiver 12k.

At the k-th receiver 12k (where k is an integer, with $1 \leq k \leq K$), the receiving data streams pass through an RF combiner 140k, $W_{RF,k}$, which is a complex matrix of dimensions $N_{r_k} \times L_{r_k}$, followed by a base band combiner 150k, $W_{BB,k}$, which is a complex matrix of dimensions $L_{r_k} \times N_{s_k}$.

After processing by the base band combiner 150k, the k-th receiver 12k outputs $N_{s_k}$ data streams O1, O2, . . . , $ON_{s_k}$.

Therefore, the narrow band block fading transmission for the signal received the k-th receiver 12k (where k is an integer, with $1 \leq k \leq K$) is:

$$y_k = W_{BB,k}^H W_{RF,k}^H H_k F_{RF} F_{BB} s + W_{BB,k}^H W_{RF,k}^H n_k$$

where:
$M^H$ denotes the conjugate transpose matrix of a matrix M, $$y_k \in \mathbb{C}^{N_{s_k} \times 1}$$

is the receive signal at the k-th receiver 12k, $$H_k \in \mathbb{C}^{N_{r_k} \times N_t}$$

is the user channel for the k-th receiver 12k, $$s_k \in \mathbb{C}^{N_{s_k} \times 1}$$

is the data symbol for the k-th receiver 12k, and $s=[s_1^H \ldots s_K^H]^H$ is the concatenation of the data symbols for all the receivers 12k, $n_k$ is the noise vector for the k-th receiver 12k.

In the case the user channel (or "channel state information", CSI) $H_k$ is not perfectly known at the receiver, a channel estimation may be performed in order to estimate the CSI at the Receiver (CSIR). Any method of the state of the art for estimating the CSIR may be performed. In this disclosure, $H_k$ may denote the perfect CSIR if it is known, or it may denote an estimation of CSIR obtained by a dedicated method.

For example and without limitation, it may be assumed that the power of data symbol vector satisfies $\mathbb{E}[ss^H]=I_{N_s}$, where $\mathbb{E}$ denotes the statistical expectation, and that $n_k$ is a Gaussian vector. For instance, $n_k$ may be a white Gaussian noise:

$$n_k \sim \mathcal{N}_\mathbb{C}(0, \sigma^2 I_{N_{s_k}}),$$

wherein $$I_{N_{s_k}}$$

is the identity matrix of size $N_{s_k}$.

It may also be assumed that the RF and base band precoders are subjected to the following total power constraint: $\|F_{RF}F_{BB}\|_F^2=P$, where P is the average total transmitting power.

The RF precoder/combiners of the hybrid architecture may be implemented by phase shifters, each transceiver being connected to each antenna through a network of phase shifters. In this case, it may be assumed for example that the matrices $F_{RF}$ and $W_{RF,1}, \ldots, W_{RF,K}$ satisfy:

$$[F_{RF}]_{m,n} = \frac{1}{\sqrt{N_t}} e^{j\theta_{m,n}}$$

$$[W_{RF,k}]_{m,n} = \frac{1}{\sqrt{N_r}} e^{j\varphi_{m,n}^{(k)}} \text{ for all } k, 1 \le k \le K$$

$$\theta_{m,n} \in \Phi_{prec}, \varphi_{m,n}^{(k)} \in \Phi_{comb}^{(k)} \text{ for all } k, 1 \le k \le K$$

where $\Phi_{prec}$ is the discrete set of the quantization phase for the phase shifters at transmitter and $\Phi_{comb}^{(k)}$ is the discrete set of the quantization phase for the phase shifters at k-th receiver, with $1 \le k \le K$.

Thus, the analog precoding matrices $F_{RF,1}, \ldots, F_{RF,K}$ and the analog combining matrices $W_{RF,1}, \ldots, W_{RF,K}$ can take only certain values. Hence, these matrices may be selected from finite-size codebooks.

It is assumed that, for any receiver indexed by k ($1 \le k \le K$), $F_{RF,k}$ takes its value in a codebook $\mathcal{C}_{prec,k}$, where $$\mathcal{C}_{prec,k} \subseteq \mathbb{C}^{N_t \times L_{r_k}},$$

and $W_{RF,k}$ takes its value in a codebook $\mathcal{C}_{comb,k}$, where $$\mathcal{C}_{comb,k} \subseteq \mathbb{C}^{N_{r_k} \times L_{r_k}}.$$

Any types of codebooks may be chosen for $\mathcal{C}_{prec,k}$ and $\mathcal{C}_{comb,k}$. For instance, Grassmannian codebooks or beam-steering codebooks may be used.

Elements of a codebook are referred to as codewords. More specifically, in order to ease the reading of the present description, an element of a codebook corresponding to a RF precoding matrix is referred to as an analog precoding codeword (or RF precoding codeword), and an element of a codebook corresponding to a RF combining matrix is referred to as an analog combining codeword (or RF combining codeword).

Of course, the architecture represented in FIG. 1 is only an example of a system in which the present method may be performed. Other systems may be considered. For instance, at receivers, there may be only analog combiners instead of both analog and digital combiners. Also, there may be other components than those represented in FIG. 1, and alternative equations for modeling the system may be used instead of those introduced above.

Figure 2:
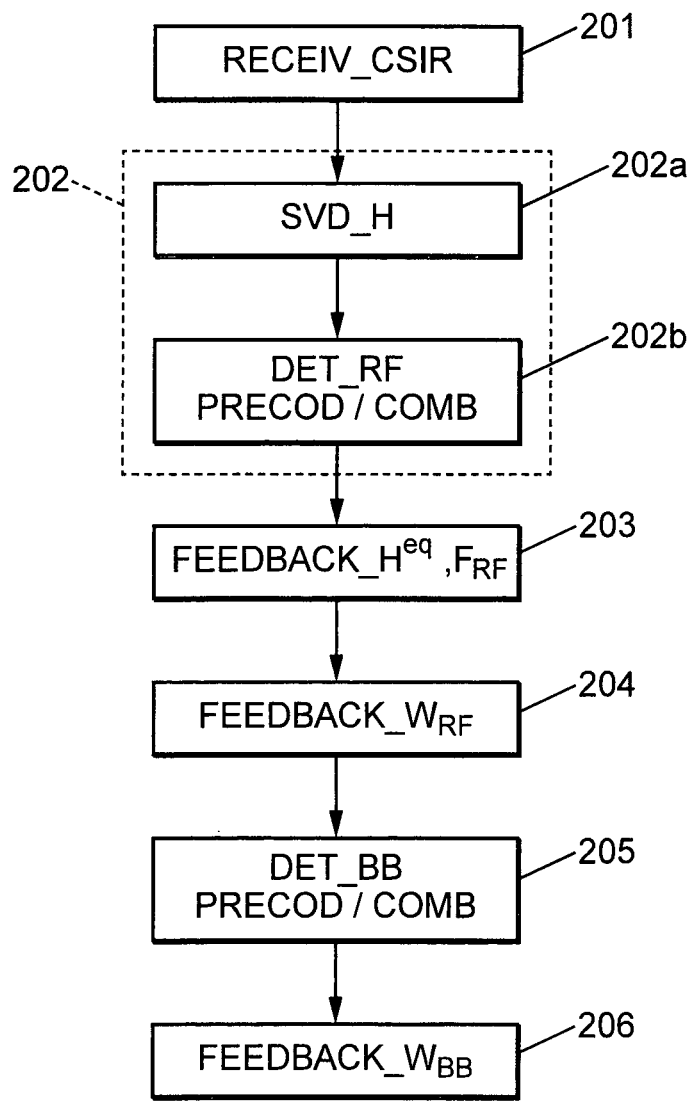
FIG. 2 is a flow chart describing a possible embodiment of the present invention.

FIG. 2 is a flow chart describing a possible embodiment of the present invention.

In a first step 201, Channel State Information at Receiver (CSIR) is received and is available at receivers.

For instance, a set of CSIR matrices $\{H_k\}_{k=1,\ldots,K}$, each matrix $$H_k \in \mathbb{C}^{N_{r_k} \times N_t}$$

representing the channel between the transmitter and the k-th receiver, may be calculated by a downlink (DL) channel estimation procedure using pilots.

As mentioned before, any estimation method of the state of the art can be used. For instance, a Minimum Mean-Square Error (MMSE) estimation method, or a Bayesian estimation method may be performed.

Optionally, after step 201, a predefined user scheduling procedure may be performed to select users for the downlink (DL) transmission, the selected multiple users sharing the same radio resources.

In step 202, which includes steps 202a and 202b, RF precoders and RF combiners are calculated at the receivers.

More specifically, in step 202a, a Singular Value Decomposition (SVD) is performed on the CSIR matrix $H_k$, for each receiver k:

$$H_k = U_k \Sigma_k V_k^H = [\bar{U}_k \ \tilde{U}_k] \begin{bmatrix} \bar{\Sigma}_k & 0 \\ 0 & \tilde{\Sigma}_k \end{bmatrix} [\bar{V}_k \ \tilde{V}_k]^H$$

where $U_k \in \mathbb{C}^{N_{r_k} \times N_{r_k}}$, $\Sigma_k \in \mathbb{C}^{N_{r_k} \times N_t}$, $V_k \in \mathbb{C}^{N_t \times N_t}$, $\bar{U}_k \in \mathbb{C}^{N_{r_k} \times L_{r_k}}$, $\bar{\Sigma}_k \in \mathbb{C}^{L_{r_k} \times L_{r_k}}$, $\bar{V}_k \in \mathbb{C}^{N_t \times L_{r_k}}$, $\tilde{U}_k \in \mathbb{C}^{N_{r_k} \times (N_{r_k} - L_{r_k})}$, $\tilde{\Sigma}_k \in \mathbb{C}^{(N_{r_k} - L_{r_k}) \times (N_t - L_{r_k})}$, and $\tilde{V}_k \in \mathbb{C}^{N_t \times (N_t - L_{r_k})}$ It is assumed for instance that the singular values in $\Sigma_k$ are ranked in descending order. The columns of $\bar{U}_k$ (resp. $\bar{V}_k$) are the largest $L_{r_k}$ left (resp. right) singular vectors for the singular value decomposition of $H_k$.

In step 202b, at each receiver of index k, the RF precoding matrix $F_{RF,k}$ and the RF combining matrix $W_{RF,k}$ are chosen among codebooks $\mathcal{C}_{prec,k}$ and $\mathcal{C}_{comb,k}$ respectively, based on $\bar{U}_k$ and $\bar{V}_k$ obtained by the SVD.

More precisely, the sets of matrices $F_{RF,k}$ and $W_{RF,k}$ (k=1, ..., K) may be chosen in order to maximize (or, at least, approach the maximum) the sum rate $R_{RF,BC}$ of the system equivalent Broadcast Channel (BC) under RF precoding/beamforming, that is, for the equivalent user channel (which is the user channel after RF precoding and combining)

$$H_k^{eq} = W_{RF,k}^H H_k F_{RF} \in \mathbb{C}^{L_{r_k} \times L_t}.$$

According to uplink downlink duality, the sum rate $R_{RF,BC}$ of the system equivalent Broadcast Channel (BC) is equivalent to the sum rate $R_{RF,MAC}$ of the system equivalent Multiple-Access Channel (MAC). Therefore:

$$R_{RF,BC} = R_{RF,MAC} \geq \log\left(\det\left(\frac{P}{KL_r}\sum_{k=1}^{K}(H_k^{eq})^H H_k^{eq} + I\right)\right)$$

$$R_{RF,BC} \geq \sum_{k=1}^{K}\log\left(\det\left(\frac{P}{KL_r}(H_k^{eq})^H H_k^{eq} + I\right)\right) + \log\frac{\det((H^{eq})^H H^{eq})}{\det(\oplus_{k=1}^{K}(H_k^{eq})^H H_k^{eq})}$$

where $$\sum_{k=1}^{K}\log\left(\det\left(\frac{P}{KL_r}(H_k^{eq})^H H_k^{eq} + I\right)\right) =$$

$$\sum_{k=1}^{K}\log\left(\det\left(\frac{P}{KL_r}W_{RF,k}^H H_k F_{RF} F_{RF}^H H_k^H W_{RF,k} + I\right)\right) \geq$$

$$\sum_{k=1}^{K}\log\left(\det\left(\frac{P}{KL_r}W_{RF,k}^H H_k F_{RF,k} F_{RF,k}^H H_k^H W_{RF,k} + I\right)\right)$$

thus, $R_{RF,BC} \geq q_1 + q_2$ with $$q_1 = \sum_{k=1}^{K}\log\left(\det\left(\frac{P}{KL_r}W_{RF,k}^H H_k F_{RF,k} F_{RF,k}^H H_k^H W_{RF,k} + I\right)\right)$$

and $$q_2 = \log\frac{\det((H^{eq})^H H^{eq})}{\det(\oplus_{k=1}^{K}(H_k^{eq})^H H_k^{eq})}$$

where:
det(M) denotes the determinant of a matrix M;
$H^{eq} = [H_1^{eq} \ldots H_k^{eq} \ldots H_K^{eq}]$;
$\oplus_{k=1}^{K}(M_k)$ denotes the direct sum of a set of matrices $M_1, \ldots, M_K$, which is the block diagonal matrix wherein the blocks of the diagonal are the matrices $M_1, \ldots, M_K$;
I is the identity matrix;
P is the average total transmitting power.

In the last equation, the first term $q_1$ can be maximized using local CSIR, and the second term $q_2$ is lower or equal to zero. The maximum value of $q_2$, which is zero, can actually only be reached with full CSI at the Transmitter (CSIT), which is unknown at the first stage of calculating RF precoder/combiner. Hence, only the first term is considered in the optimization problem to solve.

Furthermore, it may be noticed that, in case of a massive MIMO system, if the K users (receivers) are randomly located, the probability that these users have disjoint Angle Of Arrival (AOA) support is high, which means that the second term $q_2$ is close to zero. This means that, in case of a massive MEMO system, a solution which maximizes the first term $q_1$ is a good solution for maximizing the sum rate.

Therefore, matrices $F_{RF,k}$ and $W_{RF,k}$ are chosen so as to maximize $q_1$. For this purpose, each RF precoding matrix $F_{RF,k}$ and each RF combining matrix $W_{RF,k}$ associated to a receiver k is chosen so as to maximize:

$$\log\left(\det\left(\frac{P}{KL_r}W_{RF,k}^H H_k F_{RF,k} F_{RF,k}^H H_k^H W_{RF,k} + I\right)\right)$$

The optimization problem to solve can thus be formulated as:

$$\max_{W_{RF,k}, F_{RF,k}} \log\left(\det\left(\frac{P}{KL_r}W_{RF,k}^H H_k F_{RF,k} F_{RF,k}^H H_k^H W_{RF,k} + I\right)\right)$$

s.t.

$W_{RF,k} \in V_{L_r}(\mathbb{C}^{N_r})$ $F_{RF,k} \in V_{L_t}(\mathbb{C}^{N_t})$ where $V_{L_r}(\mathbb{C}^{N_r}) = \{W \in \mathbb{C}^{N_r \times L_r}: WW^H = I_{L_r}\}$ is the complex Stiefel manifold of orthonormal $L_r$ frames in $\mathbb{C}^{N_r}$, and $V_{L_t}(\mathbb{C}^{N_t}) = \{F \in \mathbb{C}^{N_t \times L_t}: FF^H = I_{L_t}\}$ is the complex Stiefel manifold of orthonormal $L_t$ frames in $\mathbb{C}^{N_t}$.

In the case where there are no constraints due to limited phase resolution on $F_{RF,k}$ and $W_{RF,k}$, an optimal solution for this optimization problem is given by:

$W_{RF,k}^{opt} = \overline{U}_k$ $F_{RF,k}^{opt} = \overline{V}_k$ where $\overline{U}_k$ and $\overline{V}_k$ are determined based on a SVD on $H_k$, as mentioned before.

If however there are constraints due to limited phase resolution on $F_{RF,k}$ and $W_{RF,k}$, as considered in the present case, then $F_{RF,k}$ and $W_{RF,k}$ may be selected from predefined codebooks $\mathcal{C}_{prec,k}$ and $\mathcal{C}_{comb,k}$.

Hence, a solution is to choose, at each receiver k, an RF precoding matrix $F_{RF,k}$ in the RF precoding codebook $\mathcal{C}_{prec,k}$ and an RF combining matrix $W_{RF,k}$ in the RF combining codebook $\mathcal{C}_{comb,k}$ such that a quantity $\Delta R_k = R_k(W_{RF,k}^{opt}, F_{RF,k}^{opt}) - R_k(W_{RF,k}, F_{RF,k})$ $\Delta R_k = R_k(\overline{U}_k, \overline{V}_k) - R_k(W_{RF,k}, F_{RF,k})$ is minimal (and eventually can be approximated by zero when the size of the codebooks increases), $R_k(W_{RF,k}, F_{RF,k})$ being a function of $W_{RF,k}$ and $F_{RF,k}$.

Figure 3:
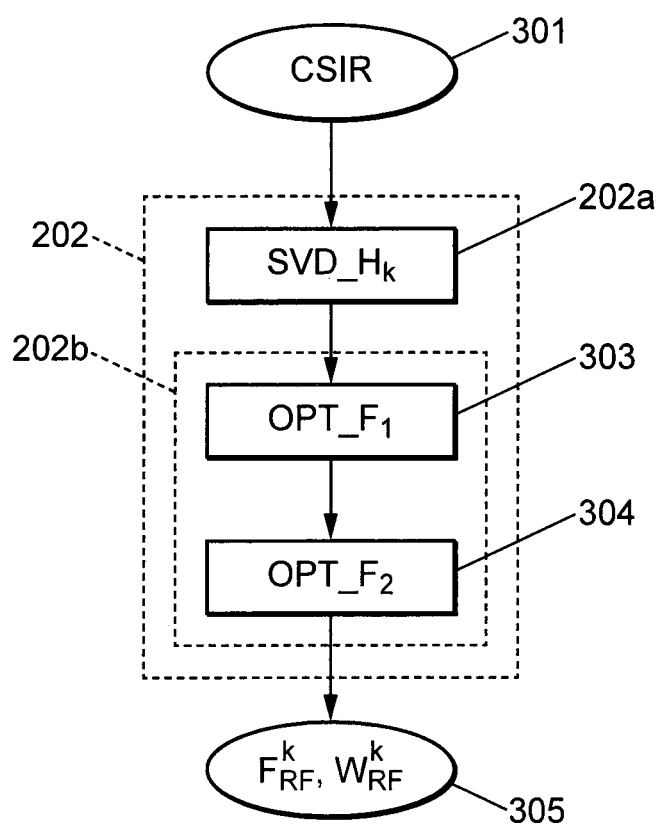
FIG. 3 is a flow chart describing a computation of RF precoders and combiners in a possible embodiment of the present invention.

Examples of criterion enabling to choose such matrices $F_{RF,k}$ and $W_{RF,k}$ at a receiver k are presented on section relative to FIG. 3.

According to FIG. 2, after step 202b, a channel estimation method may be performed for estimating the equivalent user channel $H_k^{eq} = W_{RF,k}^H H_k F_{RF}$.

Since this equivalent user channel has far smaller dimension than the original channel, obtain full CSIT $\{H_1^{eq}, \ldots, H_K^{eq}\}$ require much less feedback than obtaining full CSIT $\{H_1, \ldots, H_K\}$.

Then, each receiver may quantize and feedback to the transmitter, as well as the index of the chosen RF precoding codeword $F_{RF,k}$ (step 203).

At step 204, the index of the chosen $W_{RF,k}$ can also be fed back to the transmitter. This step is optional, and not necessary in the case of a massive MIMO system, as explained further.

At step 205, the base band precoding and combining matrices are calculated at the transmitter.

Then, the base band combining matrices $W_{BB,1}, \ldots, W_{BB,K}$ may be fed back from the transmitter (step 206). This step 206 is optional. Alternatively, each RX k can calculate the relative $W_{BB,k}$ based on a precoded demodulation reference signal and the knowledge of the base band precoder $F_{BB}$.

Each receiver k can then apply its relative RF combining matrix $W_{RF,k}$ and its relative base band combining matrix $W_{BB,k}^H$.

Each receiver can apply the RF precoder $F_{RF}$ and the base band precoder $F_{BB}$.

FIG. 3 is a flow chart describing a computation of RF precoders and combiners in a possible embodiment of the present invention. This computation is performed at one receiver among the plurality of receivers of the system. Hence, the following computation method shall be applied to every receiver.

A CSIR matrix $H_k$ (301) is available at receiver k. As mentioned above, an SVD is performed on this CSIR matrix (step 202a):

$$H_k = [U_k \ \bar{U}_k] \begin{bmatrix} \Sigma_k & 0 \\ 0 & \bar{\Sigma}_k \end{bmatrix} [V_k \ \bar{V}_k]^H$$

The step 202b of determining the RF precoding and combining matrices may be decomposed into two steps:

choose (step 303) the RF precoding matrix relative to receiver k as the analog precoding codeword which optimizes (that is, minimizes or maximizes) a first function $g_1(V_k, F)$:

$$F_{RF,k} = \underset{F \in C_{prec,k}}{\arg\min/\max} g_1(V_k, F)$$

choose (step 304) the RF combining matrix relative to receiver k as the analog combining codeword which optimizes (that is, minimizes or maximizes) a second function $g_2(U_k, W)$:

$$W_{RF,k} = \underset{W \in C_{comb,k}}{\arg\min/\max} g_2(U_k, W)$$

At the output, matrices $F_{RF,k}$ and $W_{RF,k}$ (305) are available at receiver k.

Examples of optimizations relative to functions $g_1(V_k, F)$ and $g_2(U_k, W)$ (steps 303 and 304) are now presented.

In a possible embodiment, $F_{RF,k}$ or $W_{RF,k}$ may be chosen according to the following first criterion:

$$F_{RF,k} = \underset{F \in C_{prec,k}}{\arg\min} \|V_k V_k^H - FF^H\|_F^2$$

$$W_{RF,k} = \underset{W \in C_{comb,k}}{\arg\min} \|U_k U_k^H - WW^H\|_F^2$$

where $\|M\|_F$ is a matrix norm, for instance the Frobenius norm.

According this criterion, the RF precoding and combining matrices are chosen as the closest to the optimal one, in terms of a mathematical distance (for instance, the chordal distance).

This first criterion may be used, for instance, if the predefined codebooks $C_{prec,k}$ and $C_{comb,k}$ are random uniform codebooks or Grassmannian codebooks.

If the analog precoding codebook and the analog combining codebook are beamsteering codebooks, this first criterion may be expressed in a different way.

A beamsteering codebook is defined as follows, in the case of an RF precoding codebook (the case of an RF combining codebook may be considered similarly): each column of an RF precoding codeword is chosen from one column of a Discrete Fourier Transform (DFT) matrix, or from one column of an oversampled DFT matrix, wherein an $N_t \times N_{Q_t}$ oversampled DFT matrix is constructed by re-normalizing a sub-matrix of the first $N_t$ rows of a $N_{Q_t}$ point DFT matrix.

For example, it may be assumed that $N_{Q_t} = TN_t$, where $N_{Q_t}$ is the total number of possible phases for the phase shifter, and T is the oversampling ratio (T>1). Each column of a precoding codeword may be selected from an $N_t \times N_{Q_t}$ oversampled DFT matrix.

An advantage of using analog precoding codebooks obtained from a DFT or an oversampled DFT matrix if that the feedback of the matrices $F_{RF,k}$ does not require much feedback resource.

If the analog precoding codebook and the analog combining codebook are beamsteering codebooks, then:

$$\underset{F \in C_{prec,k}}{\arg\min} \|V_k V_k^H - FF^H\|_F^2 = \underset{F \in C_{prec,k}}{\arg\max} \sum_{i=1}^{L_r} \sum_{j=1}^{L_r} |F^H(:,i) \cdot V_k(:,j)|^2$$

and $$\underset{W \in C_{comb,k}}{\arg\min} \|U_k U_k^H - WW^H\|_F^2 = \underset{W \in C_{comb,k}}{\arg\max} \sum_{i=1}^{L_r} \sum_{j}^{L_r} |W^H(:,i) \cdot U_k(:,j)|^2$$

where:

|Q| denotes a magnitude of a complex Q; and

M(:, j) is a j-th column of a matrix M.

Thus, a second criterion for choosing $F_{RF,k}$ or $W_{RF,k}$ in an alternative embodiment is:

$$F_{RF,k} = \underset{F \in C_{prec,k}}{\arg\min} \sum_{i=1}^{L_r} \sum_{j=1}^{L_r} |F^H(:,i) \cdot V_k(:,j)|^2$$

$$W_{RF,k} = \underset{F \in C_{prec,k}}{\arg\min} \sum_{i=1}^{L_r} \sum_{j=1}^{L_r} |W^H(:,i) \cdot U_k(:,j)|^2$$

Actually, the first and second criteria are equivalent in case of beamsteering codebooks.

For implementing this second criterion in the case of the analog precoding codebook $F_{RF,k}$, the following algorithm may be performed:

for each column $c_i$ of the $N_t \times N_t$ DFT matrix or of the $N_t \times N_{Q_t}$ oversampled DFT matrix associated to the RF precoding codebook, calculate:

$$t_i = \sum_{j=1}^{L_{r_k}} |c_i^H \cdot V_k(:,j)|^2$$

define the columns of $F_{RF,k}$ as the columns $c_i$ which correspond to the $L_{r_k}$ largest values of $t_i$ among all calculated values of $t_i$.

As for the last step, this means that the first column of $F_{RF,k}$ is chosen as the column $c_i$ which corresponds to the largest value of $t_i$. Then, the second column of $F_{RF,k}$ is chosen as the column $c_i$ which corresponds to the second largest value of $t_i$, etc.

In other word, let assume that $$t_1 \geq t_2 \geq \ldots \geq t_{L_{r_k}} \geq \ldots .$$

Then, if for i=1, . . . , $L_{r_k}$, $c_i$ is the column which corresponds to $t_i$ (which means that $t_i$ has been calculated from $c_i$ according to the previous equation), $F_{RF,k}$ is defined as:

$$F_{RF,k} = [\,c_1 \;\; c_2 \;\; \ldots \;\; c_{L_{r_k}}\,].$$

Similarly, in the case of the analog combining codebook $W_{RF,k}$, the following algorithm may be performed:

for each column $c_i$ of the DFT matrix or the $N_r \times N_{Q_r}$ oversampled DFT matrix associated to the RF precoding codebook, calculate:

$$b_i = \sum_{j=1}^{L_{r_k}} |c_i^H \cdot U_k(:,j)|^2$$

define the columns of $W_{RF,k}$ as the columns $c_i$ which correspond to the $L_{r_k}$ largest values of $b_i$ among all calculated values of $b_i$.

In another embodiment, $F_{RF,k}$ or $W_{RF,k}$ may be chosen according to the following third criterion:

$$F_{RF,k} = \underset{F \in \mathcal{C}_{prec,k}}{\mathrm{argmin}} \lambda_{min}(\overline{V}_k^H F F^H \overline{V}_k)$$

$$W_{RF,k} = \underset{W \in \mathcal{C}_{comb,k}}{\mathrm{argmin}} \lambda_{min}(\overline{U}_k^H W W^H \overline{U}_k)$$

where $\lambda_{min}(M)$ denotes a minimal eigenvalue of a matrix M.

This criterion also enables to solve the problem of minimizing $\Delta R_k$. Indeed, let:

$$\rho_1 = \underset{F \in C_{F_{RF,k}}}{\max} \lambda_{min}(\overline{V}_k^H F F^H \overline{V}_k)$$

$$\rho_2 = \underset{W \in C_{W_{RF,k}}}{\max} \lambda_{min}(\overline{U}_k^H W W^H \overline{U}_k)$$

Then, it can be shown that:

$$\Delta R_{quant} \leq K L_r \log \frac{1}{\rho_1 \rho_2}$$

Since $0 \leq \rho_1 \leq 1$ and $0 \leq \rho_2 \leq 1$, when the sizes of codebooks increase, $\rho_1$ and $\rho_2$ approach 1, and the rate loss due to the quantization decreases (and approaches zero).

This third criterion may be used, for instance, if the predefined codebooks $\mathcal{C}_{prec,k}$ and $\mathcal{C}_{comb,k}$ are random uniform codebooks or Grassmannian codebooks.

If the analog precoding codebook is a beamsteering codebook, the following procedure, relative to third criterion, may be used for computing the analog precoding matrices:

Initialization:
select a column $f_1$ from the beamsteering codebook such that $f_1^H \overline{V}_k \overline{V}_k^H f_1$ is maximized;
let $C_1 = f_1$,
For i=2 . . . $L_r$
Select a column $f_i$ from the beamsteering codebook which is different from the columns of $C_{i-1}$ such that $$t = \frac{f_i^H \overline{V}_k \overline{V}_k^H f_i + \lambda_{min}(C_{i-1}^H \overline{V}_k \overline{V}_k^H C_{i-1})}{2} -$$

$$\sqrt{\frac{(f_i^H \overline{V}_k \overline{V}_k^H f_i - \lambda_{min}(C_{i-1}^H \overline{V}_k \overline{V}_k^H C_{i-1}))^2}{4} + f_i^H \overline{V}_k \overline{V}_k^H C_{i-1} C_{i-1}^H \overline{V}_k \overline{V}_k^H f_i}$$

is maximized;
Let $C_i = [C_{i-1} \; f_i]$ be the concatenate matrix whose first columns are all columns of $C_{i-1}$, and last column is $f_i$.
The analog precoding matrix associated to receiver k is $F_{RF,k} = C_{L_r}$.

Similarly, if the analog precoding codebook is a beamsteering codebook, the analog combining matrices may be calculated as follows:

Initialization:
select a column $w_1$ from the beamsteering codebook such that $w_1^H \overline{U}_k \overline{U}_k^H w_1$ is maximized;
let $Z_1 = w_1$;
For i=2 . . . $L_r$
Select a column $w_i$ from the beamsteering codebook which is different from the columns of $Z_{i-1}$ such that $$t = \frac{w_i^H \overline{U}_k \overline{U}_k^H w_i + \lambda_{min}(Z_{i-1}^H \overline{U}_k \overline{U}_k^H Z_{i-1})}{2} -$$

$$\sqrt{\frac{(w_i^H \overline{U}_k \overline{U}_k^H w_i - \lambda_{min}(Z_{i-1}^H \overline{U}_k \overline{U}_k^H Z_{i-1}))^2}{4} + w_i^H \overline{U}_k \overline{U}_k^H Z_{i-1} Z_{i-1}^H \overline{U}_k \overline{U}_k^H w_i}$$

is maximized;
Let $Z_i = [Z_{i-1} \; w_i]$ be the concatenate matrix whose first columns are all columns of $Z_{i-1}$, and last column is $w_i$.
The analog combining matrix associated to receiver k is $W_{RF,k} = Z_{L_r}$.

Figure 4:
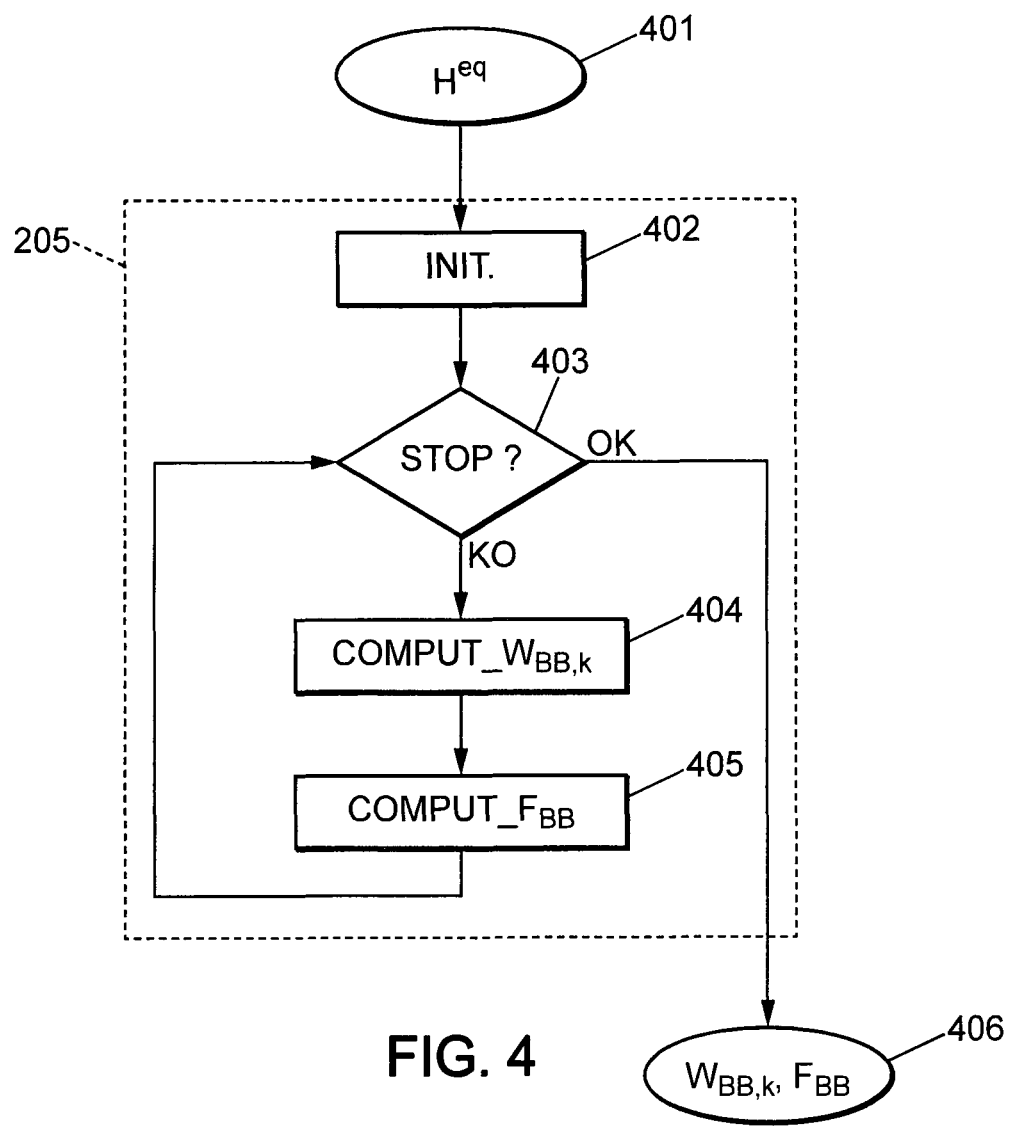
FIG. 4 is a flow chart describing a computation of Base Band precoders and combiners in a possible embodiment of the present invention.

FIG. 4 is a flow chart describing a computation of Base Band precoders and combiners in a possible embodiment of the present invention.

In a possible embodiment of the present invention, the Base Band precoders and combiners may be computed (step 205), based on the set of equivalent user channels $H_k^{eq}$ (401) obtained by feedback from receivers, by the following iterative algorithm:

at step 402, initialize the base band precoder $F_{BB}=[F_{BB,1} \ldots F_{BB,K}]$ and the set of base band combining matrices $W_{BB,1}, \ldots, W_{BB,K}$;

at step 403, perform a stop test based on a stop criterion:
  if the test is positive (OK), the iterative algorithm stops, and current $F_{BB}$ and $W_{BB,1}, \ldots, W_{BB,K}$ (406) are outputted;
  if the test is negative (KO):
    update (404) $W_{BB,1}, \ldots, W_{BB,K}$ based on the set of equivalent user channels $H_1^{eq}, \ldots, H_K^{eq}$ and on the $W_{BB,1}, \ldots, W_{BB,K}$ at the previous iteration;
    update (405) $F_{BB}$ based on current $W_{BB,1}, \ldots, W_{BB,K}$ and on the set of equivalent user channels $H_1^{eq}, \ldots, H_K^{eq}$;
    perform the stop test (403).

The invention is not limited to this algorithm, and the Base Band precoders and combiners may be computed by any other method of the state of the art.

In a non-limiting manner, examples of equations for the algorithm are given below.

At step 402, $F_{BB}$ may be randomly initialized and normalized to satisfy the power constraint:

$$\overline{F_{BB}} = randn(L_t, N_s)$$

$$F_{BB} = \sqrt{\frac{P}{tr(F_{BB}F_{BB}^H F_{RF}^H F_{RF})}} \overline{F_{BB}}$$

where randn(I,J) returns an I×J matrix of random entries.

Alternatively, $F_{BB}$ may be initialized with the first $N_s$ columns of the matched filter, which is $[(H_1^{eq})^H \ldots (H_K^{eq})^H]$, and normalized to satisfy the power constraint:

$$\overline{F_{BB}} = [(H_1^{eq})^H \ldots (H_K^{eq})^H]_{(:,1:N_s)}$$

$$F_{BB} = \sqrt{\frac{P}{tr(F_{BB}F_{BB}^H F_{RF}^H F_{RF})}} \overline{F_{BB}}$$

where $A_{(:,i:j)}$ denotes a matrix whose columns are columns of indexes i to j of a matrix M.

The base band combining matrices $W_{BB,1}, \ldots, W_{BB,K}$ may also be randomly initialized. Alternatively, they may be initialized from the computed $F_{BB}$, for instance based on the equations mentioned in the following section.

The stop test performed at step 403 may be based on a convergence criterion. For instance it may be decided that the algorithm stops when:

the distance (in a mathematical sense, for instance the chordal distance) between current $F_{BB}$ and previously calculated $F_{BB}$ is below a first predetermined threshold; and for each receiver k, the distance (in a mathematical sense, for instance the chordal distance) between current $W_{BB,k}^H$ and previously calculated $W_{BB,k}^H$ is below a second predetermined threshold.

Steps 404 and 405 may be performed as follows.
For each k, k=1, ..., K:
  Calculate the effective noise covariance matrix for receiver k, given by:

$$Q_k = \sum_{l \neq k}^{K} H_k^{eq} F_{BB,l} F_{BB,l}^H (H_k^{eq})^H + \sigma^2 W_{RF,k}^H W_{RF,k}$$

Calculate the Minimum Mean Square Error (MMSE) receive filter for receiver k:

$$W_{BB,k}^H = F_{BB,k}^H (H_k^{eq})^H (H_k^{eq} F_{BB,k} F_{BB,k}^H (H_k^{eq})^H + Q_k)^{-1}$$

Calculate the weighting matrix at receiver k for the weighted MMSE minimization optimization which achieves the same Karush-Kuhn-Tucker (KKT) point as the sum rate maximization optimization:

$$M_k = I + F_{BB,k}^H (H_k^{eq})^H Q_k^{-1} H_k^{eq} F_{BB,k}$$

End for

Calculate the concatenated equivalent noise covariance matrix after the RF domain processing, which is the block diagonal matrix composed of matrices $W_{RF,k}^H W_{RF,k}$, for $1 \leq k \leq K$:

$$R = blockdiag(W_{RF,1}^H W_{RF,1} \ldots W_{RF,K}^H W_{RF,K})$$

Calculate the transmit filter which is the optimal solution for the weighted MMSE minimization (which is also the one which achieves the same KKT point as the weighted sum rate maximization):

$$\overline{F} = \left( (H^{eq})^H W M W^H H^{eq} + \frac{tr(\sigma^2 M W^H R W)}{P} I \right)^{-1} (H^{eq})^H W M$$

where:
$W^H = blockdiag(W_{BB,1}^H \ldots W_{BB,K}^H)$ is the concatenated base band MMSE receive filter for all receivers;
$M = blockdiag(M_1 \ldots M_K)$;
$H^{eq} = [(H_1^{eq})^T \ldots (H_K^{eq})^T]^T$ is the concatenated equivalent channel for all receivers;
$R = blockdiag(W_{RF,1}^H W_{RF,1} \ldots W_{RF,K}^H W_{RF,K})$;
tr(A) is the trace of a matrix A.

Normalize the average transmit power to satisfy the power constraint:

$$F_{BB} = \sqrt{\frac{P}{tr(\overline{F} \overline{F}^H F_{RF}^H F_{RF})}} \overline{F}$$

As mentioned before, steps 404 and 405 are iteratively performed until a stop criterion is met.

Of course, the method presented above for calculating the base band precoder and combiner is a possible embodiment of the present invention, but the invention is not limited to this method.

Other choices of base band beamforming methods may be used, for instance a zero forcing base band beamforming, a block diagonalization base band beamforming, etc.

Figure 5:
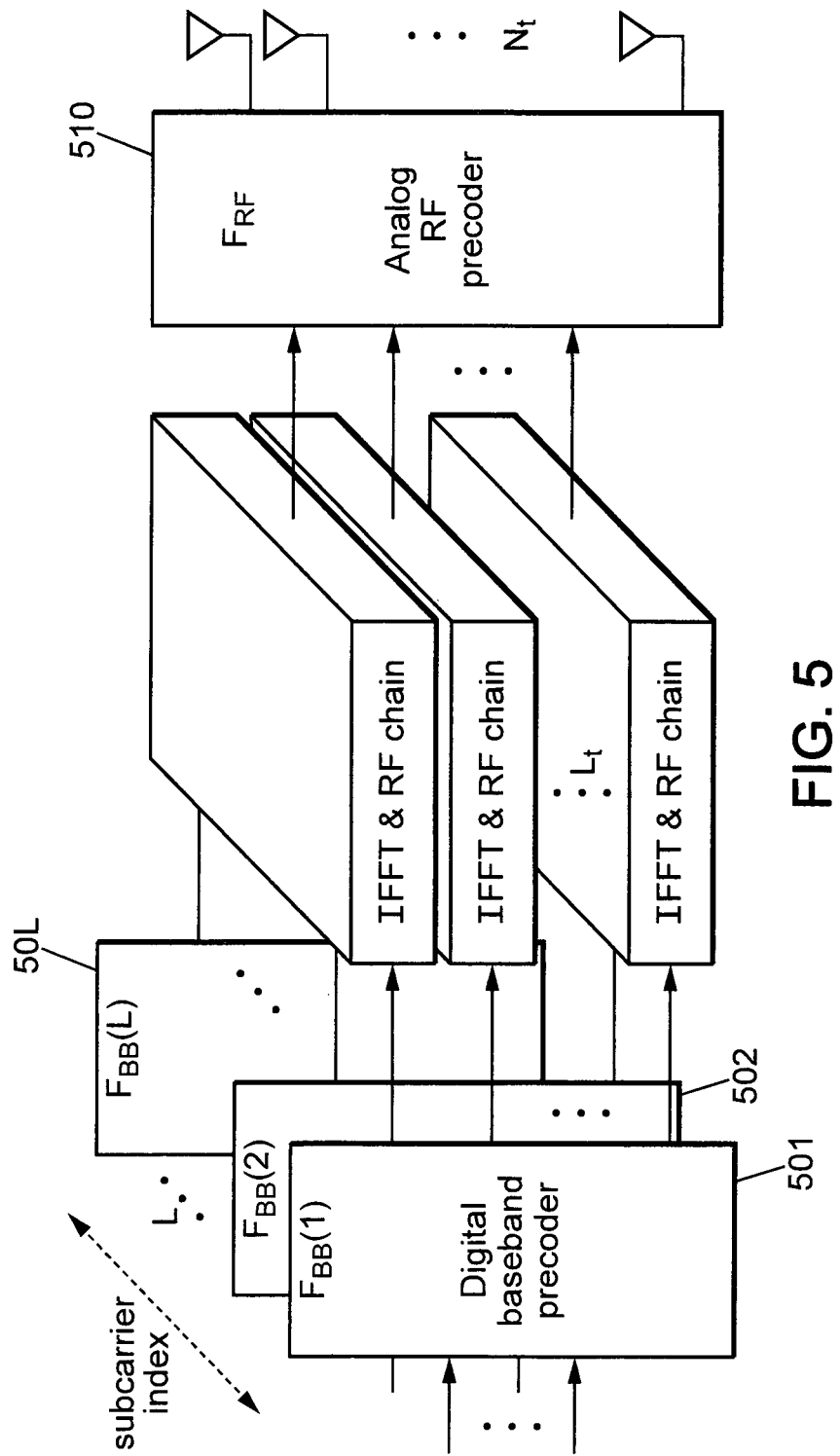
FIG. 5 represents another example of system supporting both analog and digital beamforming in which the present method can be performed.

FIG. 5 represents another example of system supporting both analog and digital beamforming in which the present method can be performed.

More precisely, only the transmitter is represented in FIG. 5, so as not to overload the figure.

The present invention may also be used in a wideband communication system, for instance in a system supporting orthogonal frequency-division multiplexing.

The main difference with the system represented in FIG. 1 is that the frequency band is divided into a plurality of subcarriers. Let L denotes the number of subcarriers.

In such a system, there are L base band combining matrices $W_{BB,k}[1], \ldots, W_{BB,k}[L]$ associated to a receiver k, and L base band precoders $F_{BB}[1], \ldots, F_{BB}[L]$ (elements 501, 502, 50L of FIG. 5). Also, the user channel $H_k[1]$ depends on the l-th subcarrier frequency.

For the kth user's, the RF combining matrices $W_{RF,k}{}^H$, and precoding matrices $F_{RF,k}$ (element 510) are the same for each subcarrier.

The received symbol at receiver k on the subcarrier l is:
$$\hat{s}_k = W_{BB,k}{}^H[l] W_{RF,k}{}^H H_k[l] F_{RF} \hat{F}_{BB}[l] \sqrt{P[l]} s + W_{BB,k}{}^H[l] W_{RF,k}{}^H n_k$$

where
$P[l] = \text{blockdiag}(P_1[l], \ldots, P_K[l])$
$P[l] = \text{diag}(p_{1,1}[l], \ldots, p_{1,N_s}[l], \ldots, p_{k,1}[l], \ldots, p_{k,N_s}[l])$
is the power allocation for the stream relative to each user, and $\hat{F}_{BB}$ is such that $F_{BB} = \hat{F}_{BB} P$, each column of the matrix $\hat{F}_{BB}[l]$ having unit norm.

The system performance may be evaluated by the sum rate for all the users and in all the subcarrier frequency.

Similarly to the hybrid beamforming in a narrow band system (as for instance the system represented in FIG. 1), an RF precoding/combining design criterion if there is no constraint on the limited phase for $W_{RF,k}{}^H$, $F_{RF,k}$ can be written:

$$\max_{W_{RF,k}^H, F_{RF,k}} \sum_{l=1}^{L} \log \left| \frac{P}{LKL_r} W_{RF,k}^H H_k[l] F_{RF,k} F_{RF,k}^H H_k^H[l] W_{RF,k} + I \right|$$

$$\text{s.t.} \quad W_{RF,k} \in V_{L_r}(\mathbb{C}^{N_r})$$
$$F_{RF,k} \in V_{L_r}(\mathbb{C}^{N_t})$$

Unlike the narrow band case where L=1 and the optimal solution to the problem above is the left (resp. right) singular subspace spanned by the $L_r$ largest left (right) singular vectors, the wideband case does not seem to have a closed form solution to the problem above.

Therefore, a sub-optimal criterion may be used.

Rather than maximizing the sum rate described in the optimization problem above, it is possible to maximize (or try to maximize) the average signal strength:

$$\sum_{l=1}^{L} \| W_{RF,k}^H H_k[l] F_{RF,k} \|_F^2$$

The optimization problem to solve in this case may be written:

$$\max_{\substack{W_{RF,k} \in C_{comb,k} \\ F_{RF,k} \in C_{prec,k}}} \sum_{l=1}^{L} \| W_{RF,k}^H H_k[l] F_{RF,k} \|_F^2$$

for arbitrary predefined RF combining and precoding codebooks $C_{comb,k}$, $C_{prec,k}$.

This optimization problem may be solved by selecting $W_{RF}{}^H$ according to a Fréchet mean criterion:
let $X_1 = \overline{U}_k[1], \ldots, X_L = \overline{U}_k[L]$;
let $d^2(A,B) = n - \text{tr}(AA^H BB^H)$, with $A, B \in \mathbb{C}^{m \times n}$ and $n < m$;

for each k, $1 \leq k \leq K$, the RF combining matrix may be expressed as:

$$W_{RF,k} = \underset{W \in C_{comb,k}}{\arg\min} \sum_{l}^{L} d^2(W, X_l)$$

that is:

$$W_{RF,k} = \underset{W \in C_{comb,k}}{\arg\min} \sum_{l=1}^{L} \left( L_{r_k} - \text{tr}\left(WW^H \overline{U}_k(l) \overline{U}_k^H(l)\right) \right)$$

Similarly:
let $Y_1 = \overline{V}_k[1], \ldots, Y_L = \overline{V}_k[L]$;
for each k, $1 \leq k \leq K$, the RF precoding matrix may be expressed as:

$$F_{RF,k} = \underset{F \in C_{prec,k}}{\arg\min} \sum_{l=1}^{L} d^2(F, Y_l)$$

that is:

$$F_{RF,k} = \underset{F \in C_{prec,k}}{\arg\min} \sum_{l=1}^{L} \left( L_{r_k} - \text{tr}\left(FF^H \overline{V}_k(l) \overline{V}_k^H(l)\right) \right)$$

It has to be noted that, when L=1, which corresponds to a narrow band system, then:

$$\sum_{l=1}^{L} \left( L_{r_k} - \text{tr}\left(WW^H \overline{U}_k(l) \overline{U}_k^H(l)\right) \right) =$$

$$L_{r_k} - \text{tr}\left(WW^H \overline{U}_k(1) \overline{U}_k^H(1)\right) = \frac{1}{2} \| \overline{U}_k(1) \overline{U}_k^H(1) - WW^H \|_F^2$$

and:

$$\sum_{l=1}^{L} \left( L_{r_k} - \text{tr}\left(FF^H \overline{V}_k(l) \overline{V}_k^H(l)\right) \right) =$$

$$L_{r_k} - \text{tr}\left(FF^H \overline{V}_k(1) \overline{V}_k^H(1)\right) = \frac{1}{2} \| \overline{V}_k(1) \overline{V}_k^H(1) - FF^H \|_F^2$$

That means that, when L=1, calculating $W_{RF,k}$ and $F_{RF,k}$ according to the above criterion is equivalent to calculating $W_{RF,k}$ and $F_{RF,k}$ according to the first criterion presented in the narrowband case:

$$F_{RF,k} = \underset{F \in C_{prec,k}}{\arg\min} \| \overline{V}_k \overline{V}_k^H - FF^H \|_F^2$$

$$W_{RF,k} = \underset{W \in C_{comb,k}}{\arg\min} \| \overline{U}_k \overline{U}_k^H - WW^H \|_F^2$$

Actually, for a narrow band system, the chosen precoder/combiner which corresponds to a maximization of the sum rate also maximizes the signal strength.

Figure 6:
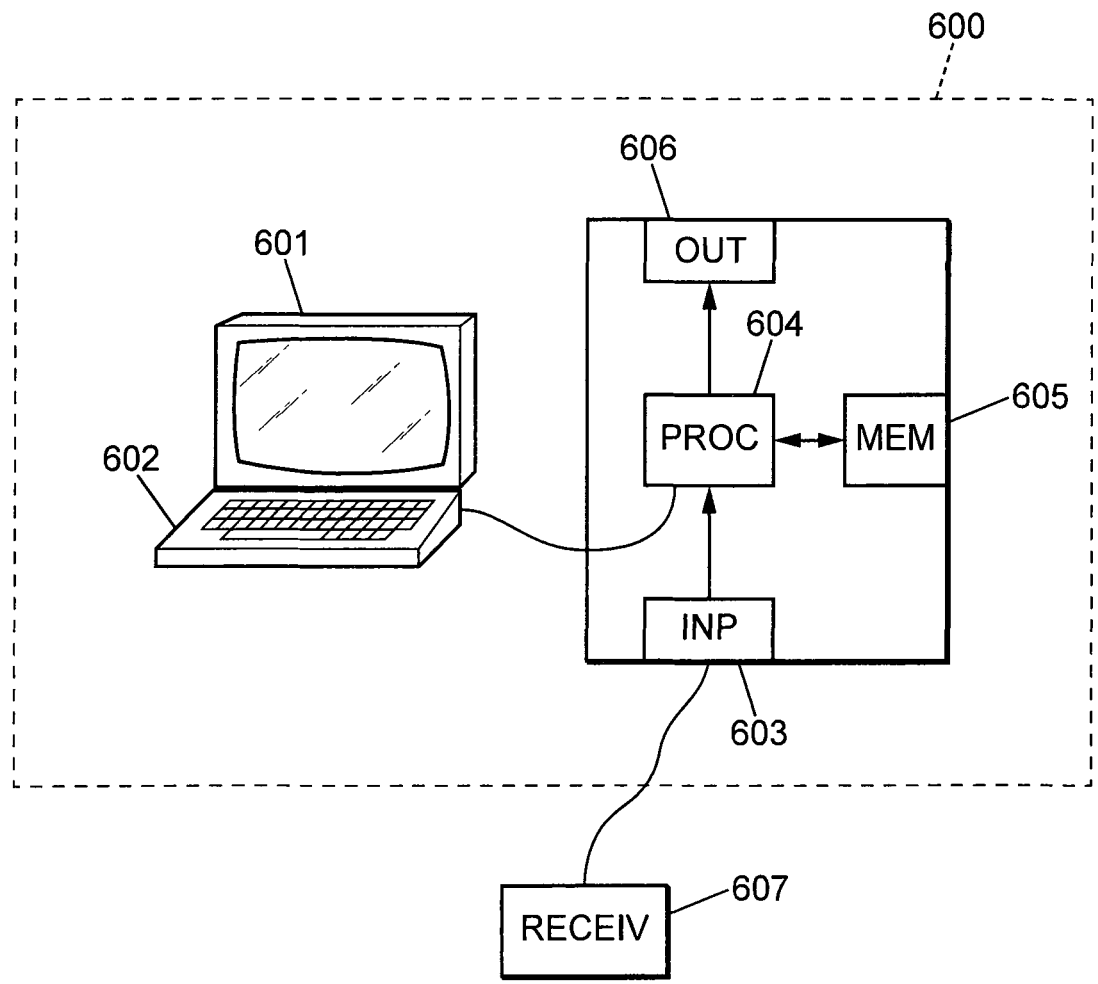
FIG. 6 is a possible embodiment for a device that enables the present invention.

FIG. 6 is a possible embodiment for a device that enables the present invention.

In this embodiment, the device 600 comprise a computer, this computer comprising a memory 605 to store program instructions loadable into a circuit and adapted to cause circuit 604 to carry out the steps of the present invention when the program instructions are run by the circuit 604.

The memory 605 may also store data and useful information for carrying the steps of the present invention as described above.

The circuit 604 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for «Field-Programmable Gate Array»).

For instance, the device may be comprised in a user equipment (or in a mobile station), and the computer may comprise an input interface 603 for the reception of CSIR according to the invention and an output interface 606 for providing the RF precoding and combining matrices.

The device may alternatively be comprised in a transmitter (for instance, into a base station), and the computer may comprise an input interface 603 for the reception of equivalent CSIT according to the invention and an output interface 606 for providing the base band precoding and combining matrices.

To ease the interaction with the computer, a screen 601 and a keyboard 602 may be provided and connected to the computer circuit 604.

Furthermore, the flow chart represented in FIG. 2 can represent all or part of the steps of a program which may be executed by a processor located in the receiver or in the transmitter. For instance, steps 201 and 202 (including 202a and 202b) may be executed by a device included in a receiver, while steps 205 and 206 may be executed by a device included in a transmitter. As such, FIG. 3 may correspond to the flow chart of the general algorithm of a computer program within the meaning of the invention.

A person skilled in the art will readily appreciate that various parameters disclosed in the description may be modified and that various embodiments disclosed may be combined without departing from the scope of the invention.

Of course, the present invention is not limited to the embodiments described above as examples. It extends to other variants. For instance, in the case of a massive MIMO system, the step 204 of FIG. 2 may be skipped. Indeed, for such a system, the columns of the matrices $W_{RF,k}^H$ are asymptotically orthonormal:

$$W_{RF,k}^H W_{RF,k} = I_{L_{r_k}}, N_{r_k} \to \infty$$

Thus, in a massive MIMO system, it can be considered that $$W_{RF,k}^H W_{RF,k} = I_{L_{r_k}},$$

which simplifies the equations of the MMSE estimation of the base band precoder and combining matrices.

The invention claimed is:

1. A method implemented by a computer for maximizing a sum rate of a communication system, said communication system enabling both analog and digital beamforming, said communication system including a transmitter being able to serve a plurality of receivers, wherein each receiver among the plurality of receivers is associated to a relative set $\mathcal{C}_{prec,k}$ of analog precoding codewords, wherein $\mathcal{C}_{prec,k}$ is the set of analog precoding codewords associated to the $k^{th}$ receiver, said method comprising:

for each receiver among the plurality of receivers, computing, at said receiver, an analog precoding matrix $F_{RF,k}$ associated to said receiver, wherein $F_{RF,k}$ is the analog precoding matrix associated to the $k^{th}$ receiver; and using at least one computed analog precoding matrix for processing at least one signal to transmit from the transmitter to at least one receiver;

wherein the computation of the analog precoding matrix associated to a receiver among the plurality of receivers comprises:

/a/ performing a Singular Value Decomposition, SVD, on a channel matrix associated to said receiver;

/b/ determining a first decomposition matrix $\overline{V}_k$ based on the relative SVD;

characterized in that the computation of the analog precoding matrix associated to a receiver among the plurality of receivers further comprises:

/c/ determining an analog precoding codeword which maximizes a first function $g_1(\overline{V}_k, F) = \lambda_{min}(\overline{V}_k^H F F^H \overline{V}_k)$ of $\overline{V}_k$ and F, for a plurality of $F \in \mathcal{C}_{prec,k}$, where:

$A^H$ denotes a conjugate transpose matrix of a matrix A; and $\lambda_{min}$ (A) denotes a minimal eigenvalue of a matrix A.

2. The method according to claim 1, wherein each receiver among the plurality of receivers is associated to a relative set $\mathcal{C}_{comb,k}$ of analog combining codewords, wherein, for each receiver among the plurality of receivers and for each subcarrier among the plurality of subcarriers, a second decomposition matrix $\overline{U}_k(l)$ is determined, based on the relative SVD performed in step /a/;

the method further comprising, for each receiver among the plurality of receivers:

computing, at said receiver, an analog combining matrix $W_{RF,k}$ associated to said receiver, said computation including:

determining an analog combining codeword which optimizes a second function $g_2(\overline{U}_k(1), \ldots, \overline{U}_k(L), W)$ of $\overline{U}_k(1), \ldots, \overline{U}_k(L)$ and W, for a plurality of $W \in \mathcal{C}_{comb,k}$.

3. The method according to claim 2, wherein the second function is:

$$g_2(\overline{U}_k(1), \ldots, \overline{U}_k(L), W) = \sum_{l=1}^{L} \left( L_{r_k} - tr(WW^H \overline{U}_k(l)\overline{U}_k^H(l)) \right)$$

where:
   tr(A) denotes a trace of a matrix A;
   $A^H$ denotes a conjugate transpose matrix of a matrix A;
   $L_{r_k}$ is a number of receiving analog chains at said receiver;
   $\overline{U}_k(l)$ is the second decomposition matrix associated to the receiver k for a subcarrier l;
   and wherein the optimization of the second function is a minimization.

4. The method according to claim 2, wherein the number of subcarriers is equal to 1,
   wherein each analog preceding; codeword F is chosen among a set of columns of a predetermined matrix having a number of rows equal to a number of antennas of the transmitter and a number of columns greater or equal than $L_{r_k}$, said matrix being a Discrete Fourier Transform, DFT, matrix or a matrix obtained by re-normalizing a sub-matrix extracted from a DFT matrix,
   and wherein the second function $g_2(\overline{U}_k, W)$ is given by:

$$g_2(\overline{U}_k, W) = \sum_{i=1}^{L_r} \sum_{j=1}^{L_r} |(W(:,i))^H \cdot \overline{U}_k(:,j)|^2$$

where:
   $L_{r_k}$ is a number of receiving analog chains at said receiver;
   |Q| denotes a magnitude of a complex Q;
   $A^H$ denotes a conjugate transpose matrix of a matrix A; and
   A(:,j) is a j-th column of a matrix A;
and wherein the optimization of the second function is a maximization.

5. The method according to claim 2, wherein the number of subcarriers is equal to 1, and wherein the second function $g_2(\overline{U}_k, W)$ is given by:

$$g_2(\overline{U}_k, W) = \lambda_{min}(\overline{U}_k^H W W^H \overline{U}_k)$$

where:
   $A^H$ denotes a conjugate transpose matrix of a matrix A; and
   $\lambda_{min}(A)$ denotes a minimal eigenvalue of a matrix A,
and wherein the optimization of the second function is a maximization.

6. The method according to claim 2, wherein an analog combining codeword W is a column of a predetermined matrix having a number of rows equal to a number of antennas of the transmitter and a number of columns greater or equal than $L_{r_k}$, said matrix being relative to Discrete Fourier Transform, DFT, matrix;
   wherein, in step /c/ the second function $g_2(\overline{U}_k, W)$ is a function of:

$$\frac{W^H \overline{U}_k \overline{U}_k^H W + \lambda_{min}(Z_{i-1}^H U_k \overline{U}_k^H Z_{i-1})}{2} - \sqrt{\frac{(W^H \overline{U}_k \overline{U}_k^H W - \lambda_{min}(Z_{i-1}^H U_k \overline{U}_k^H Z_{i-1}))^2}{4} + W^H \overline{U}_k \overline{U}_k^H Z_{i-1} Z_{i-1}^H \overline{U}_k \overline{U}_k^H W}$$

where:
   $Z_{i-1}$ is composed from at least one column of said predetermined matrix;
   W is different from all the columns of $T_{i-1}$;
   $A^H$ denotes a conjugate transpose matrix of a matrix A; and
   $\lambda_{min}(A)$ denotes a minimal eigenvalue of a matrix A,
wherein the optimization of the second function is a maximization;
and wherein step /c/ is performed iteratively for i=2 ... $L_r$, with $C_1=f_1$, where $f_1$ is a column of said predetermined matrix which maximizes a function $F^H \nabla_k \nabla_k^h F$ of $\nabla_k$ and F, for a plurality of $F \in \mathcal{C}_{prec,k}$.

7. The method according to claim 2, the method further comprising:
   for each receiver among the plurality of receivers, receiving, at the transmitter, an estimation of an equivalent user channel between the transmitter and said each receiver;
   recursively computing, at the transmitter:
      a first set of digital combining matrices, each digital combining matrix of said first set being associated to a receiver among the plurality of receivers, based on the received estimation of the equivalent user channel and on the computed analog combining matrices; and
      a second set of digital precoding matrices, each digital precoding matrix of said second set being associated to a receiver among the plurality of receivers, based on the received estimation of the equivalent user channel and at least one digital combining matrix among the first set;
wherein the recursive computation includes:
/d/ For each receiver k among the plurality of K receivers, Calculate:

$$Q_k = \sum_{l \neq k}^{K} H_k^{eq} F_{BB,l} F_{BB,l}^H (H_k^{eq})^H + \sigma^2 W_{RF,k}^H W_{RF,k}$$

where:
   $H_k^{eq}$ is the estimation of the equivalent user channel between the transmitter and said receiver k;
   $H^{eq} = [(H_1^{eq})^T \ldots (H_K^{eq})^T]^T$;
   $F_{BB,l}$ is a current digital combining matrix associated to a receiver l;
   $\sigma^2$ is a variance of a signal noise;
   $W_{RF,k}$ is the computed analog combining matrix associated to the receiver k;
   tr(A) is the trace of a matrix A;
   $A^H$ denotes a conjugate transpose matrix of a matrix A;
Update the relative digital combining matrix $W_{BB,k}$ according to:
$$W_{BB,k}^H = F_{BB,k}^H (H_k^{eq})^H (H_k^{eq} F_{BB,k} F_{BB,k}^H (H_k^{eq})^H + Q_k)^{-1}$$
where
   $A^{-1}$ denotes an inverse of a matrix A;
And calculate:
$$M_k = I + F_{BB,k}^H (H_k^{eq})^H Q_k^{-1} H_k^{eq} F_{BB,k}$$
where
   I is a matrix identity;
/e/ Define:

$$\overline{F} = \left((H^{eq})^H WMW^H H^{eq} + \frac{tr(\sigma^2 MW^H RW)}{P} I\right)^{-1} (H^{eq})^H WM$$

where:
  $W^H$ is a block diagonal matrix whose blocks are equal to $W_{BB,1}{}^H, \ldots, W_{BB,K}{}^H$;
  M is a block diagonal matrix whose blocks are equal to $M_1, \ldots, M_K$;
  R is a block diagonal matrix whose blocks are equal to $W_{RF,1}{}^H W_{RF,1}, \ldots, W_{RF,K}{}^H W_{RF,K}$;
  P is an average total transmitting power;
  Calculate the second set of digital precoding matrices from F.

8. A method implemented by a computer for maximizing a sum rate of a communication system, said communication system enabling both analog and digital beamforming, said communication system including a transmitter being able to serve a plurality of receivers,
  wherein each receiver among the plurality of receivers is associated to a relative set $\mathcal{C}_{prec,k}$ of analog precoding codewords, wherein $\mathcal{C}_{prec,k}$ is the set of analog precoding codewords associated to the $k^{th}$ receiver,
  wherein each analog precoding codeword F is a column of a predetermined matrix having a number of rows equal to a number of antennas of the transmitter and a number of columns greater or equal than $L_{r_k}$, said matrix being a Discrete Fourier Transform, DFT, matrix or a matrix obtained by re-normalizing a sub-matrix extracted from a DFT matrix;
  said method comprising:
    for each receiver among the plurality of receivers, computing, at said receiver, an analog precoding matrix $F_{RF,k}$ associated to said receiver, wherein $F_{RF,k}$ is the analog precoding matrix associated to the receiver; and
    using at least one computed analog precoding matrix for processing at least one signal to transmit from the transmitter to at least one receiver;
  wherein the computation of the analog precoding matrix associated to a receiver among the plurality of receivers comprises:
    /a/ performing a Singular Value Decomposition, SVD, on a channel matrix associated to said receiver;
    /b/ determining a first decomposition matrix $\overline{V}_k$ based on the relative SVD;
    characterized in that the computation of the analog precoding matrix associated to a receiver among the plurality of receivers further comprises:
    /c/ determining an analog precoding codeword which maximizes a first function $g_1(\overline{V}_k, F)$ of $\overline{V}_k$ and F, said first function being function of:

$$\frac{F^H \overline{V}_k \overline{V}_k^H F + \lambda_{min}(C_{i-1}^H \overline{V}_k \overline{V}_k^H C_{i-1})}{2} -$$

$$\sqrt{\frac{(F^H \overline{V}_k \overline{V}_k^H F - \lambda_{min}(C_{i-1}^H \overline{V}_k \overline{V}_k^H C_{i-1}))^2}{4} + F^H \overline{V}_k \overline{V}_k^H C_{i-1} C_{i-1}^H \overline{V}_k \overline{V}_k^H F}$$

where:
    $C_{i-1}$ is composed from at least one column of said predetermined matrix;
    F is different from all the columns of $C_{i-1}$;
    $A^H$ denotes a conjugate transpose matrix of a matrix A; and
    $\lambda_{min}(A)$ denotes a minimal eigenvalue of a matrix A;
  wherein /c/ is performed iteratively for $i=2 \ldots L_r$, with $C_1 = f_1$, where $f_1$ is column of said predetermined matrix which maximizes a function $F^H \overline{V}_k \overline{V}_k^H F$ of $\overline{V}_k$ and F, for a plurality of $F \in \mathcal{C}_{prec,k}$.

9. The method according to claim 8, wherein each receiver among the plurality of receivers is associated to a relative set $\mathcal{C}_{comb,k}$ of analog combining codewords,
  wherein, for each receiver among the plurality of receivers and for each subcarrier among the plurality of subcarriers, a second decomposition matrix $\overline{U}_k(l)$ is determined, based on the relative SVD performed in step /a/;
  the method further comprising, for each receiver among the plurality of receivers:
    computing, at said receiver, an analog combining matrix $W_{RF,k}$ associated to said receiver, said computation including:
      determining an analog combining codeword which optimizes a second function $g_2(\overline{U}_k(1), \ldots, \overline{U}_k(L), W)$ of $\overline{U}_k(1), \ldots, \overline{U}_k(L)$ and W, for a plurality of $W \in \mathcal{C}_{comb,k}$.

10. A receiver configured to receive data from a transmitter able to serve a plurality of receivers, in a communication system enabling both analog and digital beamforming,
  said receiver being associated to a set $\mathcal{C}_{prec,k}$ of analog precoding codewords,
  said receiver comprising a circuit for maximizing a sum rate of the communication system, said maximization including a computation of an analog precoding matrix $F_{RF,k}$;
  wherein the computation of the analog precoding matrix comprises:
    /a/ performing a Singular Value Decomposition, SVD, on a channel matrix;
    /b/ determining a first decomposition matrix $\overline{V}_k$ based on said SVD; and
    characterized in that the computation of the analog precoding matrix associated to a receiver among the plurality of receivers further comprises:
    /c/ determining an analog precoding codeword which maximizes a first function $g_1(\overline{V}_k, F) = \lambda_{min}(\overline{V}_k^H F F^H \overline{V}_k)$ of $\overline{V}_k$ and F, for a plurality of $F \in \mathcal{C}_{prec,k}$,
  where:
    $A^H$ denotes a conjugate transpose matrix of a matrix A; and
    $\lambda_{min}(A)$ denotes a minimal eigenvalue of a matrix A.

11. The receiver according to claim 10, said receiver being further associated to a relative set $\mathcal{C}_{comb,k}$ of analog combining codewords,
  wherein for each subcarrier among the plurality of subcarriers, a second decomposition matrix $\overline{U}_k(l)$ is determined, based on said SVD;
  said receiver further comprising a circuit for computing an analog combining matrix $W_{RF,k}$, said computation including:
    determining an analog combining codeword which optimizes a second function $g_2(\overline{U}_k(1), \ldots, \overline{U}_k(L), W)$ of $\overline{U}_k(1), \ldots, \overline{U}_k(L)$ and W, for a plurality of $W \in \mathcal{C}_{comb,k}$.

12. A communication system enabling both analog and digital beamforming, said system comprising a transmitter being able to serve a plurality of receivers, wherein each receiver is configured to receive data from said transmitter,
  said receiver being associated to a set $\mathcal{C}_{prec,k}$ of analog preceding codewords,
  said receiver comprising a circuit for maximizing a sum rate of the communication system, said maximization including a computation of an analog precoding matrix $F_{RF,k}$;

wherein the computation of the analog precoding matrix comprises:
/a/ performing a Singular Value Decomposition, SVD, on a channel matrix:
/b/ determining a first decomposition matrix $\bar{V}_k$ based on said SVD; and
characterized in that the computation of the analog precoding matrix associated to a receiver among the plurality of receivers further comprises:
/c/ determining an analog precoding, codeword which maximizes a first function $g_1(\bar{V}_k, F) = \lambda_{min}(\bar{V}_k^H FF^H \bar{V}_k)$ of $\bar{V}_k$ and F, for a plurality of $F \in \mathcal{C}_{prec,k}$,
where:
$A^H$ denotes a conjugate transpose matrix of a matrix A; and
$\lambda_{min}(A)$ denotes a minimal eigenvalue of a matrix A.

13. A computer program product, comprising instructions for performing a method implemented by a computer for maximizing a sum rate of a communication system, said communication system enabling both analog and digital beamforming, said communication system including a transmitter being able to serve a plurality of receivers,
wherein each receiver among the plurality of receivers is associated to a relative set $\mathcal{C}_{prec,k}$ of analog precoding codewords wherein $\mathcal{C}_{prec,k}$ is the set of analog precoding codewords associated to the $k^{th}$ receiver,
said method comprising:
for each receiver among the plurality of receivers, computing, at said receiver, an analog precoding matrix $F_{RF,k}$ associated to said receiver,
wherein $F_{RF,k}$ is the analog precoding matrix associated to the $k^{th}$ receiver; and
using at least one computed analog precoding matrix for processing at least one signal to transmit from the transmitter to at least one receiver;
wherein the computation of the analog precoding matrix associated to a receiver among the plurality of receivers comprises:
/a/ performing a Singular Value Decomposition, SVD, on a channel matrix associated to said receiver;
/b/ determining a first decomposition matrix $\bar{V}_k$ based on the relative SVD;
characterized in that the computation of the analog precoding matrix associated to a receiver among the plurality of receivers further comprises:
/c/ determining an analog precoding codeword which maximizes a first function $g_1(\bar{V}_k, F) = \lambda_{min}(\bar{V}_k^H FF^H \bar{V}_k)$ of $\bar{V}_k$ and F, for a plurality of $F \in \mathcal{C}_{prec,k}$,
where:
$A^H$ denotes a conjugate transpose matrix of a matrix A; and
$\lambda_{min}(A)$ denotes a minimal eigenvalue of a matrix A.

14. A computer program product, comprising instructions for performing a method implemented by a computer for maximizing a sum rate of a communication system, said communication system enabling both analog and digital beamforming, said communication system including a transmitter being able to serve a plurality of receivers,
wherein each receiver among the plurality of receivers is associated to a relative set $\mathcal{C}_{prec,k}$ of analog precoding codewords, wherein $\mathcal{C}_{prec,k}$ is the set of analog precoding codewords associated to the $k^{th}$ receiver,
said method comprising:
for each receiver among the plurality of receivers, computing, at said receiver, an analog precoding matrix $F_{RF,k}$ associated to said receiver,
wherein $F_{RF,k}$ is the analog precoding matrix associated to the $k^{th}$ receiver; and
using at least one computed analog precoding matrix for processing at least one signal to transmit from the transmitter to at least one receiver;
wherein the computation of the analog precoding matrix associated to a receiver among the plurality of receivers comprises:
/a/ performing a Singular Value Decomposition, SVD, on a channel matrix associated to said receiver;
/b/ determining a first decomposition matrix $\bar{V}_k$ based on the relative SVD;
characterized in that the computation of the analog precoding matrix associated to a receiver among the plurality of receivers further comprises:
/c/ determining an analog precoding codeword which maximizes a first function $g_1(\bar{V}_k, F) = \lambda_{min}(\bar{V}_k^H FF^H \bar{V}_k)$ of $\bar{V}_k$ and F, for a plurality of $F \in \mathcal{C}_{prec,k}$,
where:
$A^H$ denotes a conjugate transpose matrix of a matrix A; and
$\lambda_{min}(A)$ denotes a minimal eigenvalue of a matrix A.

* * * * *

UNITED STATES PATENT AND TRADEMARK OFFICE
CERTIFICATE OF CORRECTION

| | | |
|---|---|---|
| PATENT NO. | : 11,152,984 B2 | Page 1 of 1 |
| APPLICATION NO. | : 16/603779 | |
| DATED | : October 19, 2021 | |
| INVENTOR(S) | : Qianrui Li | |

It is certified that error appears in the above-identified patent and that said Letters Patent is hereby corrected as shown below:

On the Title Page

Please change:
"(73) Assignees: MITSUBISHI ELECTRIC R&D CENTRE EUROPE B.V., Schiphol Rijk (NL); MITSUBISHI ELECTRIC CORPORATION, Tokyo (JP)"
To:
--(73) Assignee: MITSUBISHI ELECTRIC CORPORATION, Tokyo (JP)--

Signed and Sealed this
Seventeenth Day of May, 2022

Katherine Kelly Vidal
*Director of the United States Patent and Trademark Office*